(12) United States Patent
Ohura et al.

(10) Patent No.: US 11,162,448 B2
(45) Date of Patent: *Nov. 2, 2021

(54) FUEL INJECTION CONTROL DEVICE FOR ENGINE

(71) Applicant: Mazda Motor Corporation, Hiroshima (JP)

(72) Inventors: Takuya Ohura, Hiroshima (JP); Tomohiro Nishida, Hiroshima (JP); Michiharu Kawano, Hiroshima (JP); Yuya Honda, Hiroshima (JP); Tota Tanii, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,040

(22) Filed: Jul. 16, 2020

(65) Prior Publication Data
US 2021/0025349 A1 Jan. 28, 2021

(30) Foreign Application Priority Data
Jul. 24, 2019 (JP) .............................. JP2019-136439

(51) Int. Cl.
*F02D 41/30* (2006.01)
*F02B 23/10* (2006.01)
(Continued)

(52) U.S. Cl.
CPC .......... *F02D 41/3041* (2013.01); *F02B 23/10* (2013.01); *F02B 31/085* (2013.01);
(Continued)

(58) Field of Classification Search
CPC .................................................. F02D 41/3041
See application file for complete search history.

(56) References Cited

U.S. PATENT DOCUMENTS 6,293,246 B1 * 9/2001 Tanahashi ............. F02D 35/023
123/305
6,520,142 B2 2/2003 Nogi et al.
(Continued)

FOREIGN PATENT DOCUMENTS

JP 2019039359 A 3/2019
JP 2019039360 A 3/2019

*Primary Examiner* — Kevin R Steckbauer
(74) *Attorney, Agent, or Firm* — Alleman Hall Creasman & Tuttle LLP

(57) ABSTRACT

A fuel injection control device for an engine is provided. A swirl generator generates a swirl flow inside a combustion chamber. A fuel injector with multiple nozzle holes injects fuel into the combustion chamber, and forms a lean mixture gas inside the combustion chamber. A spark plug ignites the lean mixture gas to cause a portion of the mixture gas to start combustion accompanied by flame propagation, and then combusts by self-ignition. The fuel injector has first and second nozzle holes, and a first atomized fuel spray injected from the first nozzle hole and a second atomized fuel spray injected from the second nozzle hole separate from each other by the swirl flow. The fuel injector performs the fuel injection in an intake stroke, and retards a start timing of the injection when an engine load is high compared to that when the load is low.

18 Claims, 11 Drawing Sheets

(51) Int. Cl.
*F02B 31/08* (2006.01)
*F02D 13/02* (2006.01)
*F02D 41/40* (2006.01)
*F02M 61/18* (2006.01)

(52) U.S. Cl.
CPC ..... *F02D 13/0261* (2013.01); *F02D 41/3023* (2013.01); *F02D 41/401* (2013.01); *F02D 41/402* (2013.01); *F02M 61/1806* (2013.01); *F02B 2023/102* (2013.01); *F02B 2023/103* (2013.01); *F02B 2023/106* (2013.01); *F02B 2023/108* (2013.01); *F02D 2200/10* (2013.01)

(56) References Cited

U.S. PATENT DOCUMENTS

| | | | | |
|---|---|---|---|---|
| 6,609,493 B2* | 8/2003 | Yamaguchi | F02D 41/005 | 123/299 |
| 7,021,277 B2 | 4/2006 | Kuo et al. | | |
| 7,168,420 B1* | 1/2007 | Yang | F02D 41/003 | 123/568.15 |
| 7,234,438 B2* | 6/2007 | Yang | F02B 11/00 | 123/295 |
| 7,240,659 B2* | 7/2007 | Yang | F02D 35/025 | 123/295 |
| 7,681,550 B2* | 3/2010 | Kobayashi | F02D 41/3035 | 123/299 |
| 8,468,823 B2 | 6/2013 | Hitomi et al. | | |
| 8,544,444 B2* | 10/2013 | Hitomi | F02D 41/3047 | 123/294 |
| 9,328,688 B2* | 5/2016 | Hitomi | F02D 41/402 | |
| 9,702,316 B2 | 7/2017 | Iwai et al. | | |
| 9,863,372 B2* | 1/2018 | Fujimoto | F02D 41/0025 | |
| 10,247,156 B2* | 4/2019 | Sakai | F02M 67/12 | |
| 10,480,395 B2* | 11/2019 | Matsumoto | F02B 31/06 | |
| 10,480,479 B2* | 11/2019 | Nakashima | F02P 5/153 | |
| 10,487,720 B2* | 11/2019 | Inoue | F02D 41/402 | |
| 10,502,147 B2* | 12/2019 | Inoue | F02D 45/00 | |
| 10,519,882 B2* | 12/2019 | Tsuda | F02D 41/0042 | |
| 10,539,098 B2* | 1/2020 | Inoue | F02P 5/1502 | |
| 10,605,193 B2* | 3/2020 | Sueoka | F02B 3/02 | |
| 10,641,161 B2* | 5/2020 | Tanaka | F02B 1/14 | |
| 10,641,188 B2* | 5/2020 | Inoue | F02D 35/028 | |
| 10,641,192 B2* | 5/2020 | Sueoka | F02D 41/0065 | |
| 10,641,193 B2* | 5/2020 | Sueoka | F02D 41/0057 | |
| 10,641,197 B2* | 5/2020 | Sueoka | F02B 1/12 | |
| 10,648,409 B2* | 5/2020 | Inoue | F02D 13/0249 | |
| 10,648,422 B2* | 5/2020 | Inoue | F02D 41/0007 | |
| 10,648,443 B1* | 5/2020 | Inoue | F02D 41/3041 | |
| 10,677,143 B2* | 6/2020 | Tsumura | F02P 15/00 | |
| 10,697,391 B2* | 6/2020 | Inoue | F02D 41/0007 | |
| 10,704,480 B2* | 7/2020 | Sueoka | F02B 31/06 | |
| 10,711,708 B2* | 7/2020 | Matsumoto | F02D 41/26 | |
| 10,731,589 B2* | 8/2020 | Tanaka | F02D 35/023 | |
| 10,767,593 B2* | 9/2020 | Inoue | F02P 5/045 | |
| 10,767,612 B2* | 9/2020 | Tanaka | F02D 35/023 | |
| 10,794,317 B2* | 10/2020 | Tanaka | F02D 41/3035 | |
| 10,801,420 B2* | 10/2020 | Inoue | F02D 41/3041 | |
| 10,871,112 B2* | 12/2020 | Shishime | G01L 23/227 | |
| 10,895,208 B2* | 1/2021 | Inoue | F02D 41/3029 | |
| 10,895,214 B2* | 1/2021 | Inoue | F02D 41/0002 | |
| 10,895,215 B2* | 1/2021 | Yamaguchi | F01B 11/02 | |
| 10,907,550 B2* | 2/2021 | Inoue | F02D 41/0057 | |
| 10,914,259 B2* | 2/2021 | Maruyama | F02M 61/14 | |
| 10,927,749 B2 | 2/2021 | Tokunaga et al. | | |
| 2002/0053336 A1 | 5/2002 | Nogi et al. | | |
| 2002/0059914 A1* | 5/2002 | Yamaguchi | F02D 41/3041 | 123/299 |
| 2006/0016422 A1 | 1/2006 | Kuo et al. | | |
| 2007/0062483 A1* | 3/2007 | Yang | F02D 41/3041 | 123/295 |
| 2007/0062486 A1* | 3/2007 | Yang | F02B 11/00 | 123/305 |
| 2007/0233354 A1* | 10/2007 | Yang | F02D 35/025 | 701/104 |
| 2008/0275621 A1* | 11/2008 | Kobayashi | F02D 41/3035 | 701/103 |
| 2010/0242899 A1* | 9/2010 | Hitomi | F02D 35/023 | 123/299 |
| 2010/0242900 A1* | 9/2010 | Hitomi | F02D 41/402 | 123/299 |
| 2011/0067679 A1 | 3/2011 | Hitomi et al. | | |
| 2011/0120416 A1* | 5/2011 | Lamping | F02D 19/087 | 123/445 |
| 2013/0327293 A1* | 12/2013 | Dieler | F02D 41/3041 | 123/406.12 |
| 2017/0022924 A1* | 1/2017 | Fujimoto | F02M 25/0224 | |
| 2018/0216592 A1* | 8/2018 | Sakai | F02D 41/3041 | |
| 2018/0306131 A1* | 10/2018 | Tsuda | F02D 41/40 | |
| 2018/0334949 A1* | 11/2018 | Inoue | F02B 9/02 | |
| 2018/0334989 A1* | 11/2018 | Inoue | F02D 41/0065 | |
| 2018/0334998 A1* | 11/2018 | Inoue | F02D 41/0052 | |
| 2019/0063303 A1* | 2/2019 | Matsumoto | F02P 5/045 | |
| 2019/0063337 A1* | 2/2019 | Inoue | F02B 7/00 | |
| 2019/0063338 A1* | 2/2019 | Matsumoto | F02D 19/0642 | |
| 2019/0063344 A1* | 2/2019 | Matsumoto | F02D 41/3029 | |
| 2019/0063350 A1* | 2/2019 | Inoue | F02D 41/3064 | |
| 2019/0063360 A1* | 2/2019 | Inoue | F02B 1/14 | |
| 2019/0063361 A1* | 2/2019 | Yamaguchi | F02D 41/3076 | |
| 2019/0063394 A1* | 2/2019 | Nakashima | F02D 37/02 | |
| 2019/0093575 A1* | 3/2019 | Inoue | F02D 41/3041 | |
| 2019/0101046 A1* | 4/2019 | Inoue | F02D 13/02 | |
| 2019/0101071 A1* | 4/2019 | Inoue | F02D 37/02 | |
| 2019/0107040 A1* | 4/2019 | Tsumura | F02D 41/006 | |
| 2019/0107061 A1* | 4/2019 | Inoue | F02D 41/0007 | |
| 2019/0112988 A1* | 4/2019 | Inoue | F02D 45/00 | |
| 2019/0112989 A1* | 4/2019 | Inoue | F02D 41/0007 | |
| 2019/0145306 A1* | 5/2019 | Tanaka | F02D 41/006 | 123/299 |
| 2019/0145337 A1* | 5/2019 | Tanaka | F02P 5/1502 | 123/294 |
| 2019/0145338 A1* | 5/2019 | Tanaka | F02D 41/006 | 60/285 |
| 2019/0145367 A1* | 5/2019 | Tanaka | F02M 61/14 | 123/470 |
| 2019/0186394 A1* | 6/2019 | Sueoka | F02D 41/401 | |
| 2019/0186395 A1* | 6/2019 | Sueoka | F02B 1/10 | |
| 2019/0186396 A1* | 6/2019 | Sueoka | F02D 41/3041 | |
| 2019/0186402 A1* | 6/2019 | Sueoka | F02D 41/402 | |
| 2019/0186405 A1* | 6/2019 | Sueoka | F02B 1/10 | |
| 2019/0226411 A1* | 7/2019 | Shishime | G01L 23/227 | |
| 2020/0141348 A1* | 5/2020 | Matsumoto | F02D 41/0002 | |
| 2020/0141377 A1* | 5/2020 | Inoue | F02B 23/02 | |
| 2020/0240319 A1* | 7/2020 | Tokunaga | F02D 37/02 | |
| 2020/0332704 A1* | 10/2020 | Maruyama | F02D 9/08 | |
| 2020/0332735 A1* | 10/2020 | Maruyama | F02M 26/01 | |
| 2020/0362778 A1* | 11/2020 | Ohura | F02D 9/08 | |
| 2020/0362810 A1* | 11/2020 | Ohura | F02M 61/14 | |
| 2021/0025318 A1* | 1/2021 | Ohura | F02M 61/1806 | |
| 2021/0025347 A1 | 1/2021 | Ohura et al. | | |
| 2021/0025348 A1* | 1/2021 | Ohura | F02B 11/00 | |
| 2021/0025349 A1* | 1/2021 | Ohura | F02B 31/085 | |
| 2021/0040913 A1* | 2/2021 | Kapus | F02D 41/402 | |

* cited by examiner

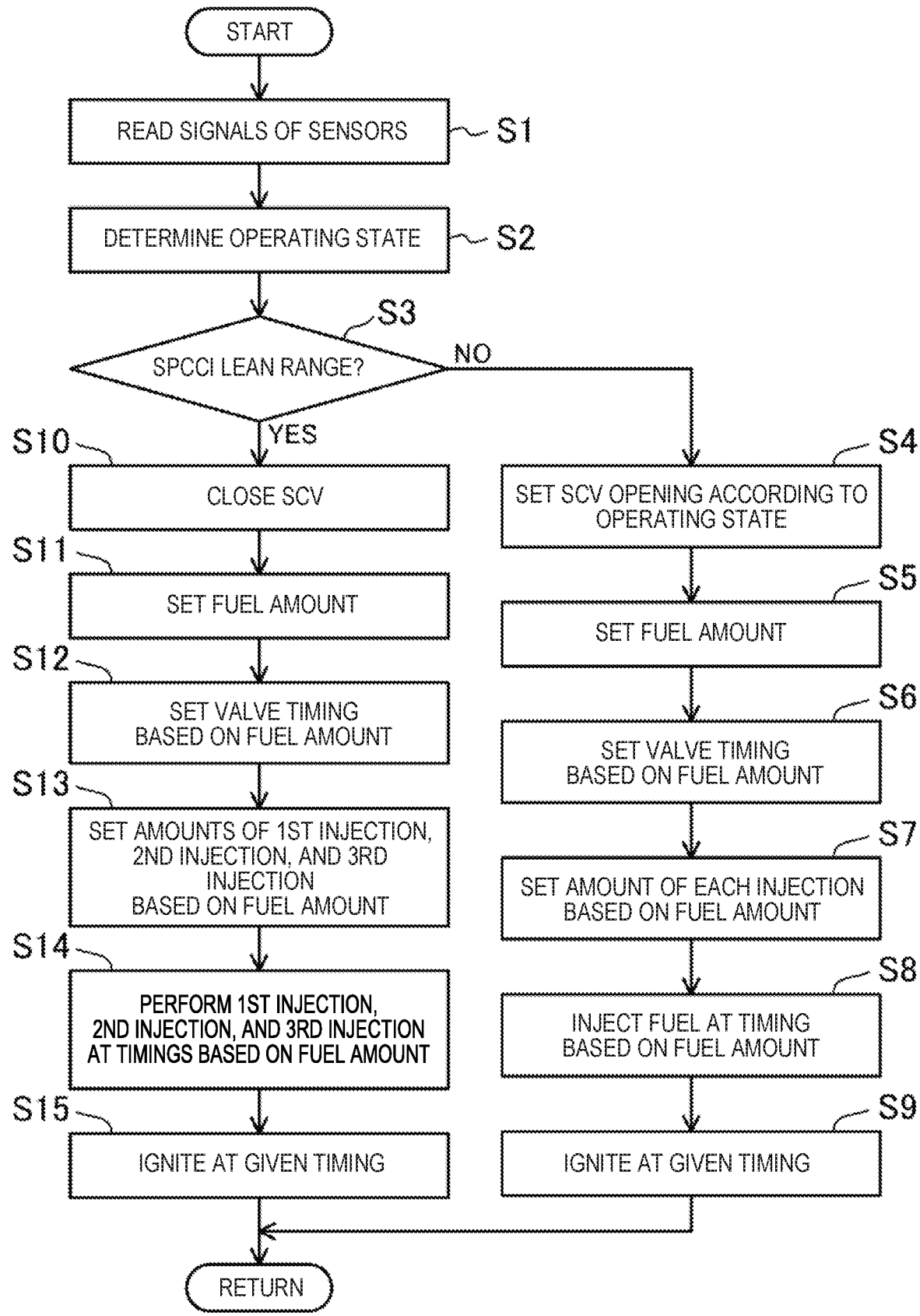

FUEL INJECTION CONTROL DEVICE FOR ENGINE

TECHNICAL FIELD

The technology disclosed herein relates to a fuel injection control device for an engine.

BACKGROUND OF THE DISCLOSURE

JP2019-039359A and JP2019-039360A disclose fuel injection devices for engines. This device injects a plurality of atomized fuel sprays toward a swirl flow inside a combustion chamber. Some of the plurality of atomized fuel sprays are separated from each other by the swirl flow, and therefore, a homogeneous and lean portion of a mixture gas is formed inside the combustion chamber. In the meantime, some of the plurality of atomized fuel sprays approach each other by the swirl flow, and therefore, a relatively rich portion of the mixture gas is formed inside the combustion chamber. Therefore, this device is capable of forming both the lean mixture gas portion and the rich mixture gas portion inside the combustion chamber.

The engine provided with such a device performs so-called SPCCI (SPark Controlled Compression Ignition) combustion. The SPCCI combustion is a form in which a spark plug forcibly ignites the mixture gas inside the combustion chamber to start combustion accompanied by flame propagation, and unburnt mixture gas then combusts by self-ignition by a generation of heat and/or a pressure increase caused by the combustion. The fuel injection device forms the rich mixture gas portion near the spark plug in the combustion chamber, and forms the lean mixture gas portion around the rich mixture gas portion. By the spark plug igniting the rich mixture gas portion, the combustion accompanied by the flame propagation is stabilized. Then, the lean mixture gas portion combusts by the self-ignition at a desired timing. The fuel injection device stabilizes the SPCCI combustion particularly when the engine load is low.

However, the present inventors noticed that the fuel injection devices disclosed in JP2019-039359A and JP2019-039360A accompany an increase in a discharge amount of $NO_x$ as the engine load becomes higher.

SUMMARY OF THE DISCLOSURE

The technology disclosed herein reduces a discharge amount of $NO_x$.

First, the present inventors tried to make a start timing of fuel injection earlier in the fuel injection devices disclosed in JP2019-039359A and JP2019-039360A. As the fuel injection is started earlier, the period of time from the fuel injection into the combustion chamber until the ignition by the spark plug, becomes longer. It is expected that, when this time period becomes longer, the fuel can be dispersed inside the combustion chamber so that an excessively rich mixture gas is reduced.

However, though the start timing of fuel injection is made earlier, the discharge amount of $NO_x$ did not decrease. The present inventors examined this and found that even if the start timing of fuel injection is made earlier, the mixture gas which is richer than expected is formed around the spark plug. That is, when the rich mixture gas is formed by the plurality of atomized fuel sprays being merged, such a mixture gas does not diffuse much over time.

Thus, the present inventors repeated experiments while changing various injection parameters. As a result, they found a fuel injection mode which is capable of reducing the excessively rich mixture gas. The technology disclosed herein is finished based on this new knowledge of the present inventors.

Specifically, according to one aspect of the present disclosure, a fuel injection control device is provided, which includes an engine having a cylinder forming a combustion chamber, a swirl generator attached to the engine and configured to generate a swirl flow inside the combustion chamber, a fuel injector with multiple nozzle holes, attached to the engine and configured to inject fuel into the combustion chamber through the nozzle holes, a spark plug attached to the engine and configured to ignite a mixture gas inside the combustion chamber, and a controller connected to the swirl generator, the fuel injector, and the spark plug, and configured to output respective control signals to the swirl generator, the fuel injector, and the spark plug. The fuel injector forms the mixture gas leaner than a stoichiometric air-fuel ratio inside the combustion chamber in response to the respective control signal. The spark plug ignites the lean mixture gas at a given timing in response to the respective control signal to cause a portion of the mixture gas to start combustion accompanied by flame propagation, and the remaining unburnt mixture gas then combusts by self-ignition. The fuel injector has at least a first nozzle hole and a second nozzle hole, and a first atomized fuel spray injected from the first nozzle hole and a second atomized fuel spray injected from the second nozzle hole separate from each other by the swirl flow. The controller causes the fuel injector to perform the fuel injection in an intake stroke, and retards a start timing of the injection when an engine load is high compared to when the engine load is low.

According to this configuration, the first atomized fuel spray injected from the first nozzle hole and the second atomized fuel spray injected from the second nozzle hole separate from each other by the swirl flow. The first atomized fuel spray and the second atomized fuel spray disperse inside the combustion chamber.

Moreover, since the fuel injector performs the injection in the intake stroke, a period of time from fuel being injected to the spark plug igniting the mixture gas, becomes longer. During the period, the spread of fuel progresses, and thus, the amount of excessively rich mixture gas in the combustion chamber is small at the ignition timing. Since the amount of the excessively rich mixture gas is small, a combustion temperature decreases. Therefore, the fuel injection control device with this configuration reduces the discharge amount of $NO_x$.

Furthermore, the average air-fuel ratio of the mixture gas throughout the combustion chamber is leaner than the stoichiometric air-fuel ratio. The engine causes the lean mixture gas to perform SPCCI combustion, and thus, thermal efficiency is high. An automobile mounted with the engine is excellent in fuel efficiency and exhaust emission performance.

The amount of fuel required per cycle increases as the engine load increases. The controller retards the start timing of the injection when the engine load becomes high compared to when the load is low.

A descending speed of a piston increases as the intake stroke progresses. When the descending speed of the piston is high, the gas flow inside the combustion chamber is strong. The "gas flow" here includes the swirl flow, and the swirl flow becomes stronger as the intake stroke progresses. If the start timing of the injection is late, the fuel can be dispersed by utilizing the strong gas flow. When the amount of the required fuel increases, the formation of an area of excessively rich mixture gas can be prevented. The fuel injection control device with this configuration reduces the discharge amount of $NO_x$ even when the engine load becomes high.

The controller may retard the start timing of the injection as the engine load increases.

Since the start timing of the injection is retarded as the amount of fuel required per cycle increases, the formation of the area of excessively rich mixture gas can be effectively prevented.

The controller may establish an overlap period during which both of an intake valve and an exhaust valve open, and cause the fuel injector to perform the fuel injection after the overlap period when the engine load is high.

The overlap period during which both of the intake valve and the exhaust valve open is established so that a portion of exhaust gas is introduced into the combustion chamber. Thus, the temperature inside the combustion chamber increases, and the self-ignition is stabilized.

If the fuel injector injects fuel during the overlap period, a portion of fuel may flow into an intake passage and/or an exhaust passage. By the fuel injector injecting fuel into the combustion chamber after the overlap period, the fuel remains inside the combustion chamber.

When the engine load is less than a first load, the controller may maintain the start timing of the fuel injection constant with respect to a change in the load. When the engine load is the first load or greater, the controller may retard the start timing of the fuel injection as the engine load increases.

When the engine load is less than the first load, the start timing of the fuel injection is maintained constant with respect to the change in the load. Therefore, the formation of the area of excessively rich mixture gas is prevented. When the engine load is low, the discharge amount of $NO_x$ is reduced.

When the engine load is the first load or greater, the start timing of the fuel injection is retarded as the engine load increases so that the fuel is dispersed by utilizing the strong gas flow. The formation of the area of excessively rich mixture gas is prevented, and thus the discharge amount of $NO_x$ is reduced.

When the engine load is the first load or greater and less than a second load, the controller may retard the start timing of the fuel injection as the engine load increases. When the engine load is the second load or greater, the controller may maintain the start timing of the fuel injection constant with respect to the change in the load.

When the engine load is the first load or greater and less than the second load, the start timing of the injection is retarded as the engine load increases. According to this, the fuel is dispersed by utilizing the strong gas flow, and the discharge amount of $NO_x$ is reduced.

The injection amount increases as the engine load increases, and thus, the period of time of the fuel injection becomes longer. When the engine load is the second load or greater, by the controller not excessively retarding the start timing of the injection, the period of time from the end of fuel injection to the ignition can be long. The dispersion time of fuel can be secured, and the formation of the area of excessively rich mixture gas can be reduced, and therefore, the discharge amount of $NO_x$ is reduced.

When the engine load is a second load or greater, the controller may maintain the start timing of the fuel injection constant with respect to a change in the load. When the engine load is less than the second load, the controller may retard the start timing of the fuel injection as the engine load increases.

The fuel injector may sequentially perform a first injection and a second injection in the intake stroke in response to the respective control signal. The controller may retard a start timing of the first injection and maintain a start timing of the second injection constant as the engine load increases.

Since the fuel injector performs the divided injections, a fuel amount per injection is small. Thus, the mixture gas formed by each injection is difficult to be excessively rich in fuel. Moreover, since the fuel injector performs the plurality of injections in the intake stroke, the dispersion time of fuel can be secured. The amount of the excessively rich mixture gas inside the combustion chamber is small at the ignition timing.

The controller retards the start timing of the first injection as engine load increases and as the injection amounts of the first injection and the second injection increase. Thus, the fuel of the first injection can be spread by utilizing the strong gas flow.

Since the start timing of the second injection is later than the first injection, the fuel of the second injection also can be dispersed by utilizing the strong gas flow. The start timing of the second injection is maintained constant even when the engine load changes, and thus, the start timing of the second injection does not become too late. The period of time from the end of the second injection to the ignition can be secured long, and the fuel of the second injection can be spread during this period.

Therefore, the amount of excessively rich mixture gas inside the combustion chamber is small at the ignition timing, and the discharge amount of $NO_x$ can be reduced.

The fuel injector may perform a third injection after the second injection in the intake stroke, in response to the respective control signal. The controller may maintain a start timing of the third injection constant with respect to a change in the engine load.

Since the fuel injector performs three injections, the mixture gas formed by each injection is difficult to be excessively rich in fuel. Moreover, since the fuel injector injects fuel in the intake stroke, the dispersion time of fuel can be secured. The amount of excessively rich mixture gas inside the combustion chamber is small at the ignition timing.

The start timing of the third injection is, similar to the second injection, later than the first injection. The fuel of the third injection can be dispersed utilizing the strong gas flow. The start timing of the third injection is maintained constant even when the engine load changes, and thus, the start timing of the third injection does not become too late. The period of time from the end of the injection to the ignition can be secured, and the fuel of the third injection can be spread during this period.

The fuel injector may inject the entire amount of fuel required per cycle in the intake stroke.

If the injection of the entire fuel is finished in the intake stroke, the period of time from the end of the injection until the spark plug igniting the mixture gas is long. Since the fuel spreads during this period, the formation of the area of excessively rich mixture gas can be prevented at the ignition timing.

The engine may have an intake port configured to generate a tumble flow inside the combustion chamber. The swirl generator may have a swirl control valve provided to an intake passage of the engine, and generate an oblique swirl flow inclined to the center axis of the cylinder by closing the swirl control valve. The nozzle holes of the fuel injector may be disposed in a central part of a ceiling of the combustion chamber. The fuel injector may inject fuel toward the oblique swirl flow radially and simultaneously through the plurality of nozzle holes.

According to this configuration, a position at which the atomized fuel spray injected by each nozzle hole of the fuel injector reaches the oblique swirl flow and a period of time until the atomized fuel spray reaches the oblique swirl flow vary among the atomized fuel sprays. Each of the atomized fuel sprays moves on with the oblique swirl flow, and thus, the atomized fuel disperses.

The swirl generator may generate the swirl flow of a swirl ratio at or greater than 2:1 and at or less than 6:1, in response to the respective control signal. The fuel injector may inject fuel at or greater than 30 MPa and at or less than 120 MPa toward the swirl flow.

When the swirl generator generates a comparatively strong swirl flow of a swirl ratio at or greater than 2:1 and at or less than 6:1, the atomized fuel spray effectively disperses by the strong swirl flow. If the pressure of fuel is too low, the atomized fuel spray does not reach the swirl flow, whereas if the pressure of fuel is too high, the atomized fuel spray penetrates the swirl flow. If the pressure of fuel is within the range of 30 MPa or greater and less than or equal to 120 MPa, the atomized fuel spray can move on with the swirl flow.

The controller may adjust a timing of the self-ignition by adjusting an amount of the combustion accompanied by the flame propagation.

The combustion by the self-ignition is influenced by the temperature inside the combustion chamber. When the temperature inside the combustion chamber changes, the timing of the self-ignition also changes. By adjusting the amount of the combustion accompanied by the flame propagation, the variation in the temperature inside the combustion chamber can be absorbed. When the amount of the combustion accompanied by the flame propagation is adjusted, unburnt mixture gas self-ignites at the suitable timing. Thus, the combustion of the engine is stabilized and the thermal efficiency of the engine improves.

The fuel injector may further have a third nozzle hole and a fourth nozzle hole. The first atomized fuel spray injected from the first nozzle hole and the second atomized fuel spray injected from the second nozzle hole may separate from each other by the swirl flow, and a third atomized fuel spray injected from the third nozzle hole and a fourth atomized fuel spray injected from the fourth nozzle hole may approach each other by the swirl flow so that a first area and a second area where the mixture gas is richer than the mixture gas in the first area are formed inside the combustion chamber.

As described above, among the plurality of the atomized fuel sprays injected by the fuel injector, the first atomized fuel spray injected from the first nozzle hole and the second atomized fuel spray injected from the second nozzle hole separate from each other by the swirl flow. The first atomized fuel spray and the second atomized fuel spray disperse inside the combustion chamber to form the first area.

The third atomized fuel spray injected from the third nozzle hole and the fourth atomized fuel spray injected from the fourth nozzle hole approach each other by the swirl flow. The third atomized fuel spray and the fourth atomized fuel spray merge together inside the combustion chamber to form the second area where the mixture gas is richer than the mixture gas in the first area. Note that as described above, the average air-fuel ratio of the mixture gas throughout the combustion chamber is leaner than the stoichiometric air-fuel ratio.

The spark plug can stably ignite the rich mixture gas and the mixture gas starts combustion accompanied by flame propagation. Then, the relatively lean mixture gas carries out the combustion by self-ignition. As described above, since the amount of excessively rich mixture gas is small, the fuel injection control device with this configuration reduces the discharge amount of $NO_x$.

The fuel injector may sequentially perform a first injection and a second injection with an injection interval therebetween in response to the respective control signal. The second area formed by the first injection, and the second area formed by the second injection may be offset in positions inside the combustion chamber from each other.

When the fuel injector performs the first injection and the second injection, the first area, and the second area where the mixture gas is rich are formed by each injection. The second area formed by each injection moves on with the swirl flow. Since the fuel injector does not perform the first injection and the second injection continuously, the second area formed by the first injection and the second area formed by the second injection do not overlap inside the combustion chamber. Thus, it is difficult for the mixture gas to be excessively rich in fuel concentration.

Moreover, since the fuel injector performs the divided injections, a fuel amount per injection is small. It is difficult for the mixture gas in the second area formed by each injection to be excessively rich in fuel.

Inside the combustion chamber, the area of the relatively lean mixture gas and the area of the relatively rich (but not too rich) mixture gas, are formed. The spark plug stably ignites the rich mixture gas, and then, the lean mixture gas stably carries out the combustion by self-ignition. The fuel injection control device with this configuration improves the combustion stability of the engine, and reduces the discharge amount of $NO_x$.

When the engine is in a given specific operating state where an engine speed is low and the engine load is low, the controller may cause the fuel injector to perform the fuel injection in the intake stroke so that the mixture gas leaner than the stoichiometric air-fuel ratio is formed inside the combustion chamber.

In a case where the air-fuel ratio of the mixture gas is made leaner than the stoichiometric air-fuel ratio, as described above, the area of lean mixture gas and the area of rich mixture gas are formed by the fuel injector, and thus, the spark plug can stably ignite the rich mixture gas, and the lean mixture gas stably self-ignites.

Further, when the engine is in the given specific operating state where the engine speed is low and the engine load is low, if the mixture gas is leaner than the stoichiometric air-fuel ratio, the fuel efficiency of the engine improves and exhaust emission performance improves.

According to another aspect of the present disclosure, a method of controlling injection of fuel is provided, which includes forming, by a fuel injector having at least a first nozzle hole and a second nozzle hole, a mixture gas leaner than a stoichiometric air-fuel ratio inside a combustion chamber formed in a cylinder of an engine. The method includes igniting, by a spark plug, the lean mixture gas at a given timing to cause a portion of the mixture gas to start combustion accompanied by flame propagation, and then combusting the remaining unburnt mixture gas by self-ignition. The method includes separating a first atomized fuel spray injected from the first nozzle hole and a second atomized fuel spray injected from the second nozzle hole from each other by a swirl flow generated inside the combustion chamber. The method includes performing, by the fuel injector, a fuel injection in an intake stroke, and retarding a start timing of the injection when an engine load is high compared to when the engine load is low.

BRIEF DESCRIPTION OF DRAWINGS

FIG. 11 is a flowchart of a control of the engine executed by an engine control unit (ECU).

DETAILED DESCRIPTION OF THE DISCLOSURE

Hereinafter, one embodiment of a fuel injection control device for an engine is described with reference to the accompanying drawings. The engine and the fuel injection control device described herein are merely an illustration.

Figure 1:
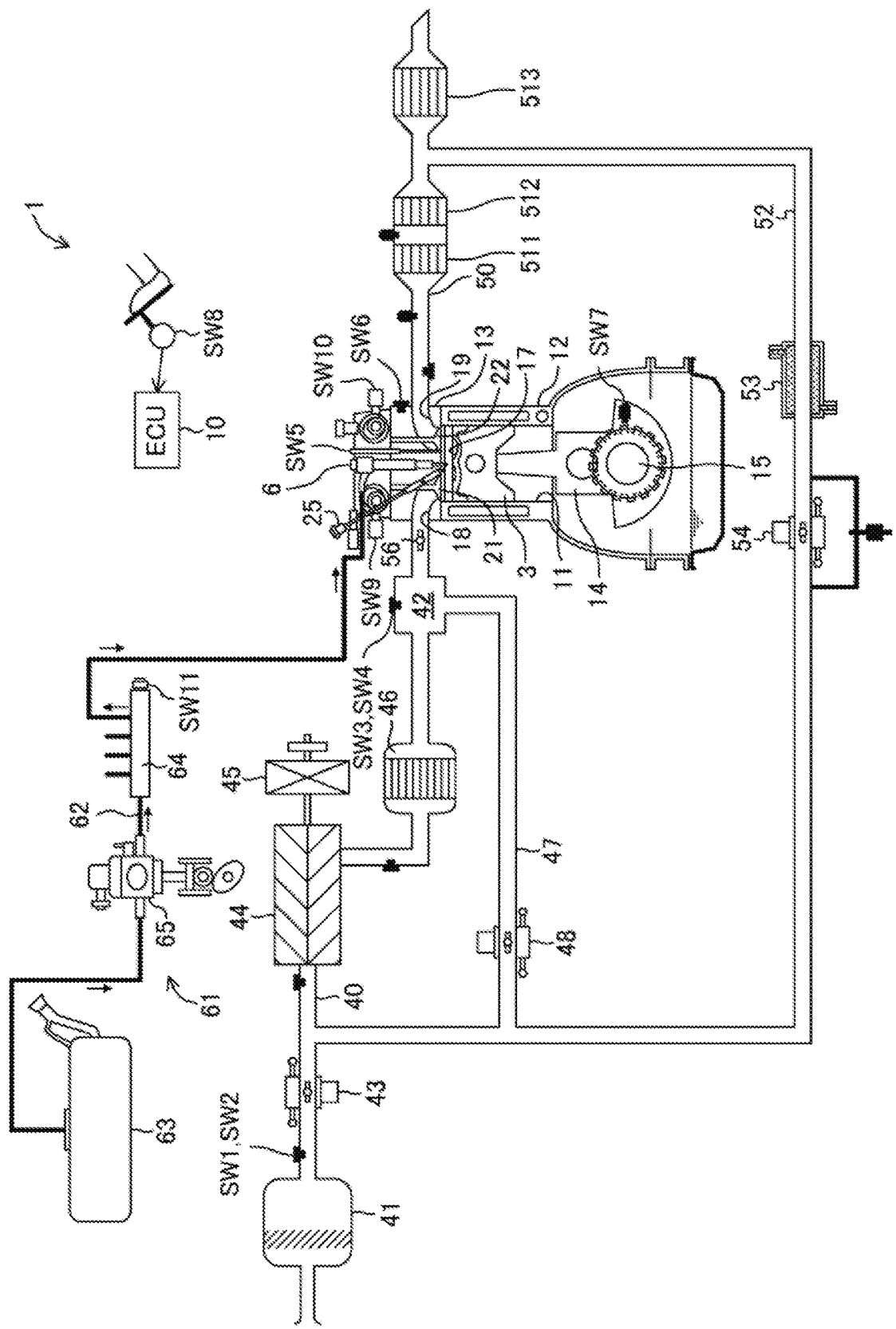
FIG. 1 is a view illustrating a configuration of an engine provided with a fuel injection control device.
Figure 2:
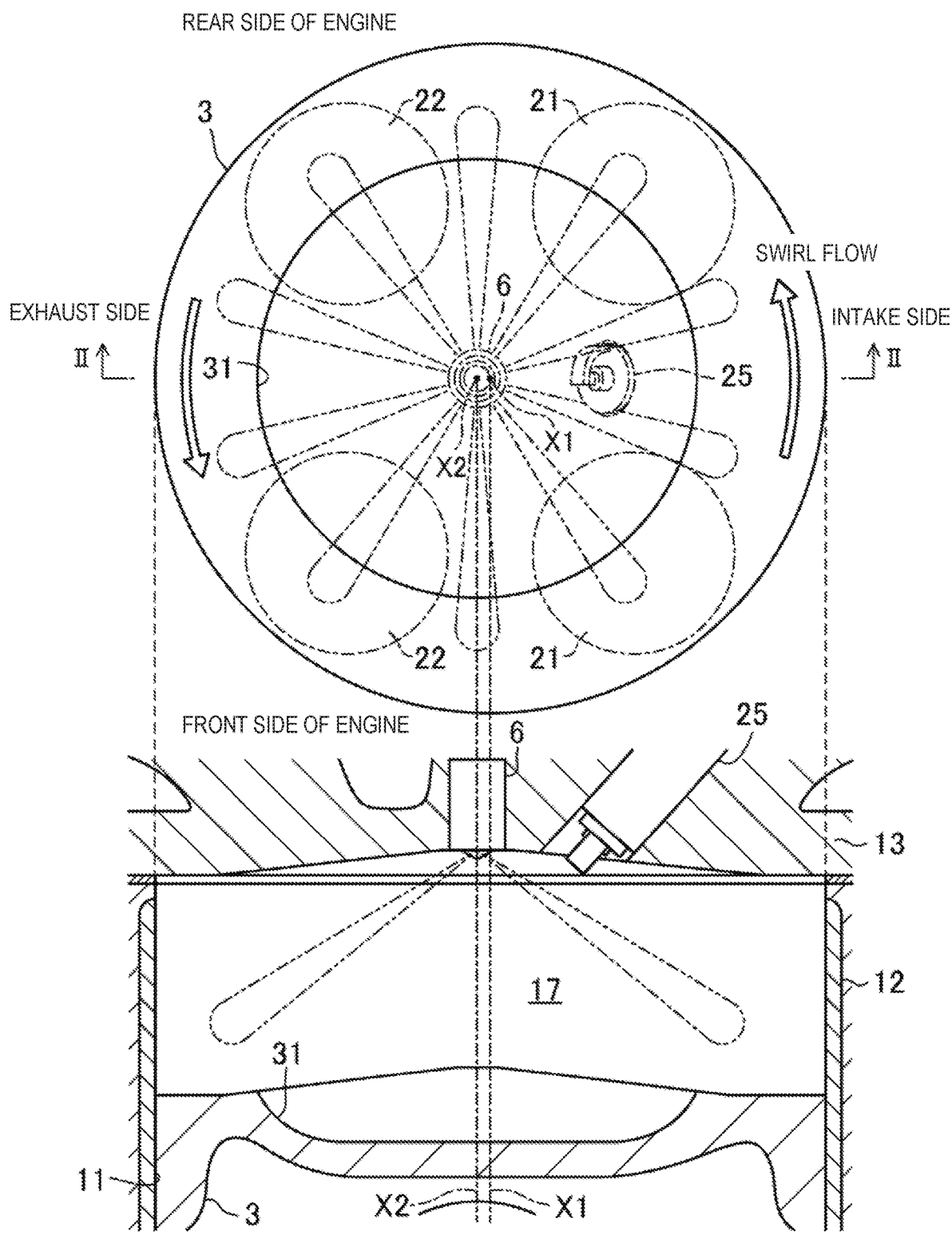
FIG. 2 is a view illustrating a combustion chamber, where an upper part of this figure is a plan view of the combustion chamber and a lower part of this figure is a cross-sectional view taken along a line II-II.
Figure 3:
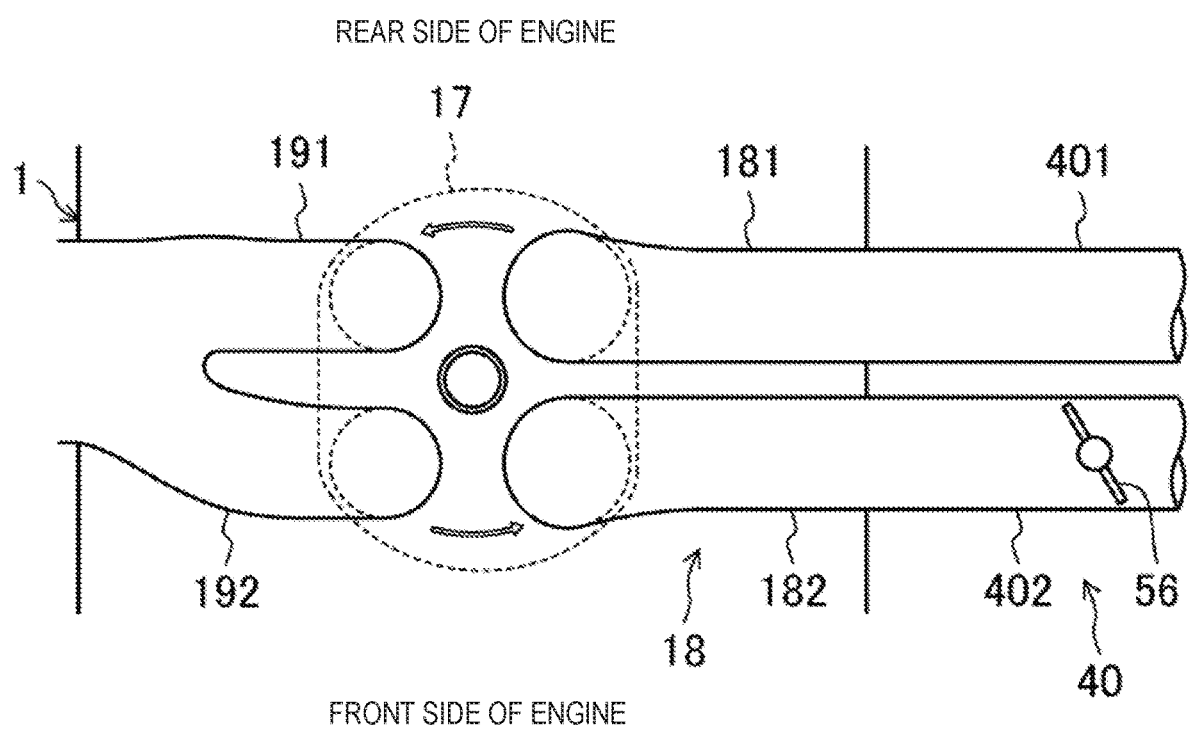
FIG. 3 is a plan view illustrating the combustion chamber and an intake passage.
Figure 4:
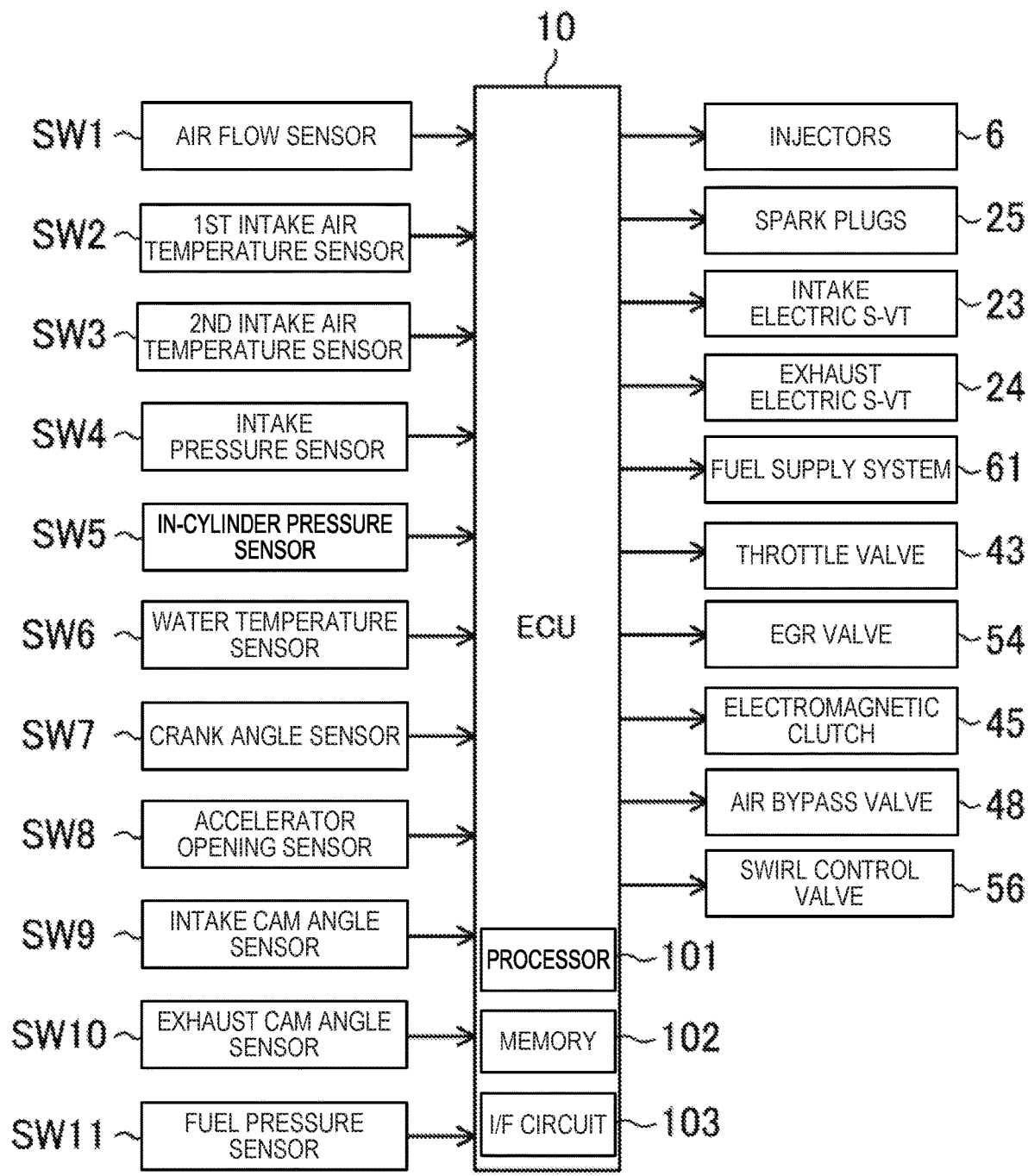
FIG. 4 is a block diagram illustrating a control device for the engine.

FIG. 1 is a view illustrating the engine. FIG. 2 is a view illustrating a combustion chamber of the engine. FIG. 3 is a view illustrating the combustion chamber and an intake passage. Note that the intake side in FIG. 1 is on the left side in this figure, and the exhaust side is on the right side in this figure. The intake side in FIGS. 2 and 3 is on the right side in these figures, and the exhaust side is on the left side in these figures. FIG. 4 is a block diagram illustrating a control device for the engine.

An engine 1 has a combustion chamber 17. The combustion chamber 17 repeats an intake stroke, a compression stroke, an expansion stroke, and an exhaust stroke. The engine 1 is a four-stroke engine. The engine 1 is mounted on an automobile with four wheels. The automobile travels by operating the engine 1. The fuel of the engine 1 is gasoline in this example. The fuel is liquid fuel which at least contains gasoline. The fuel may be gasoline which contains bioethanol, etc.

Configuration of Engine

The engine 1 includes a cylinder block 12 and a cylinder head 13. The cylinder head 13 is placed on the cylinder block 12.

A plurality of cylinders 11 are formed in the cylinder block 12. The engine 1 is a multi-cylinder engine. In FIGS. 1 and 2, only one cylinder 11 is illustrated.

A piston 3 is inserted into each cylinder 11. Each piston 3 is connected with a crankshaft 15 through a connecting rod 14. The piston 3 reciprocates inside the cylinder 11. The piston 3, the cylinder 11, and the cylinder head 13 form the combustion chamber 17. Note that the term "combustion chamber" as used herein refers to a space formed by the piston 3, the cylinder 11, and the cylinder head 13, regardless of the position of the piston 3.

A lower surface of the cylinder head 13 constitutes a ceiling of the combustion chamber 17. As illustrated in the lower part of FIG. 2, the ceiling is constituted by two slopes. The combustion chamber 17 is a so-called a pentroof type.

A cavity 31 is formed in an upper surface of the piston 3. The cavity 31 is dented from the upper surface of the piston 3. The cavity 31 has a shallow dish shape in this example. The center of the cavity 31 is offset on the exhaust side from a center axis X1 of the cylinder 11.

A geometric compression ratio of the engine 1 is set 10:1 or greater and 30:1 or less. As will be described later, the engine 1 performs SPCCI (SPark Controlled Compression Ignition) combustion in which SI (Spark Ignition) combustion and CI (Compression Ignition) combustion are combined in a part of an operating range. The SPCCI combustion controls the CI combustion by a generation of heat and/or a pressure increase caused by the SI combustion. The engine 1 is a compression ignition engine. The engine 1 does not need to raise temperature of the combustion chamber 17 when the piston 3 reaches a compression top dead center. The geometric compression ratio of the engine 1 is low. When the geometric compression ratio is low, it is advantageous in a reduction in cooling loss and a reduction in mechanical loss. The geometric compression ratio of the engine 1 may be 14:1-17:1 for regular gasoline, and 15:1-18:1 for high-octane gasoline. Note that the regular fuel is low-octane fuel of which an octane number is about 91. The high-octane fuel is high-octane fuel of which an octane number is about 96.

An intake port 18 is formed in the cylinder head 13 for each cylinder 11. As illustrated in FIG. 3, the intake port 18 has a first intake port 181 and a second intake port 182. The intake port 18 communicates with the corresponding combustion chamber 17. Although detailed illustration is omitted, the intake port 18 is a so-called a tumble port. That is, the intake port 18 has a shape which generates a tumble flow inside the combustion chamber 17.

An intake valve 21 is disposed in each intake port 18. The intake valve 21 opens and closes the intake port 18. A valve operating mechanism opens and closes each intake valve 21 at a given timing. The valve operating mechanism may be as a variable valve operating mechanism which varies a valve timing and/or a valve lift. As illustrated in FIG. 4, the valve operating mechanism has an intake electric S-VT (Sequential-Valve Timing) 23. The intake electric S-VT 23 continuously changes a rotation phase of an intake cam shaft within a given angle range. A valve opening angle of the intake valve 21 does not change. For example, the valve opening angle of the intake valve 21 is 240° CA. Note that the valve operating mechanism may have a hydraulic S-VT, instead of the electric S-VT.

An exhaust port 19 is formed in the cylinder head 13 for each cylinder 11. As illustrated in FIG. 3, the exhaust port 19 also has a first exhaust port 191 and a second exhaust port 192. The exhaust port 19 communicates with the combustion chamber 17.

An exhaust valve 22 is disposed in each exhaust port 19. The exhaust valve 22 opens and closes the exhaust port 19. The valve operating mechanism opens and closes each exhaust valve 22 at a given timing. The valve operating mechanism may be as a variable valve operating mechanism which varies a valve timing and/or a valve lift. As illustrated in FIG. 4, the valve operating mechanism has an exhaust electric S-VT 24. The exhaust electric S-VT 24 continuously changes a rotation phase of an exhaust cam shaft within a given angle range. A valve opening angle of the exhaust valve 22 does not change. For example, the valve opening angle of the exhaust valve 22 is 240° CA. Note that the valve operating mechanism may have a hydraulic S-VT, instead of the electric S-VT.

The intake electric S-VT 23 and the exhaust electric S-VT 24 adjust a length of an overlap period during which both the intake valve 21 and the exhaust valve 22 open. By adjusting the length of the overlap period, internal EGR (Exhaust Gas Recirculation) gas is introduced into the combustion chamber 17.

An injector 6 is attached to the cylinder head 13 for each cylinder 11. The injector 6 directly injects fuel into the combustion chamber 17. The injector 6 is one example of a fuel injector. The injector 6 is disposed in a central part of the ceiling of the combustion chamber 17. In detail, the injector 6 is disposed in a valley part of the pentroof. As illustrated in FIG. 2, an injection axis X2 of the injector 6 is located on the exhaust side of the center axis X1 of the cylinder 11. The injection axis X2 of the injector 6 is parallel to the center axis X1. The injection axis X2 of the injector 6 is coaxial with the center of the cavity 31. The injector 6 is opposed to the cavity 31. Note that the injection axis X2 of the injector 6 may be coaxial with the center axis X1 of the cylinder 11. In such a configuration, the injection axis X2 of the injector 6 may be coaxial with the center of the cavity 31.

The injector 6 is of a multiple nozzle hole type having a plurality of nozzle holes. As illustrated by a two-dot chain line in FIG. 2, the injector 6 injects fuel radially and obliquely downward from the central part of the ceiling of the combustion chamber 17. The injector 6 has ten nozzle holes in this example. The ten nozzle holes are disposed at equal angular intervals in the circumferential direction.

Each injector 6 is connected to a fuel supply system 61. The fuel supply system 61 includes a fuel tank 63 which stores fuel and a fuel supply passage 62. The fuel supply passage 62 connects the fuel tank 63 with the injectors 6. A fuel pump 65 and a common rail 64 are provided in the fuel supply passage 62. The fuel pump 65 sends fuel to the common rail 64. The fuel pump 65 is a plunger-type pump driven by the crankshaft 15 in this example. The common rail 64 stores the fuel sent from the fuel pump 65. The inside of the common rail 64 is high in pressure. The injectors 6 are connected to the common rail 64. When the injectors 6 are opened, high-pressure fuel inside the common rail 64 is injected into the combustion chamber 17 from the nozzle holes of the injectors 6. The fuel supply system 61 of this example is capable of supplying the high-pressure fuel at 30 MPa or greater to each injector 6. For example, the maximum pressure of the fuel supply system 61 may be 200 MPa. The fuel supply system 61 may change the pressure of fuel according to the operating state of the engine 1. Note that the configuration of the fuel supply system 61 is not limited to the configuration described above.

A spark plug 25 is attached to the cylinder head 13 for each cylinder 11. The spark plug 25 forcibly ignites a mixture gas inside the combustion chamber 17. As illustrated in FIG. 2, the spark plug 25 is disposed on the intake side of the center axis X1 of the cylinder 11. The spark plug 25 is located between the two intake ports 18. Electrodes of the spark plug 25 face to the inside of the combustion chamber 17. Note that the spark plug 25 may be disposed on the exhaust side of the center axis X1 of the cylinder 11. Moreover, the spark plug 25 may be disposed at the center axis X1 of the cylinder 11.

An intake passage 40 is connected to one side surface of the engine 1. The intake passage 40 communicates with the intake port 18 of each cylinder 11. Intake gas introduced into the combustion chamber 17 flows through the intake passage 40. An air cleaner 41 is disposed at an upstream end of the intake passage 40. A surge tank 42 is disposed near a downstream end of the intake passage 40. The intake passage 40 branches to each cylinder 11 at a location downstream of the surge tank 42.

A throttle valve 43 is disposed between the air cleaner 41 and the surge tank 42 in the intake passage 40. The throttle valve 43 adjusts an introducing amount of fresh air into the combustion chamber 17 by changing its valve opening.

A supercharger 44 is disposed in the intake passage 40, at a location downstream of the throttle valve 43. The supercharger 44 increases pressure of the intake gas introduced into the combustion chamber 17. In this example, the supercharger 44 is driven by the engine 1. The supercharger 44 is of a root type, a Lysholm type, a vane type, or a centrifugal type.

An electromagnetic clutch 45 is disposed between the supercharger 44 and the engine 1. The electromagnetic clutch 45 switches between a state in which a driving force is transmitted from the engine 1 to the supercharger 44, and a state in which the transmission of the driving force is intercepted. The supercharger 44 is turned on and off by an engine control unit (ECU) 10 (described later) outputting a control signal to the electromagnetic clutch 45.

An intercooler 46 is disposed in the intake passage 40, at a location downstream of the supercharger 44. The intercooler 46 cools the intake gas compressed by the supercharger 44. The intercooler 46 is of a water cooled type or an oil cooled type.

A bypass passage 47 is connected to the intake passage 40. The bypass passage 47 connects a part of the intake passage 40 upstream of the supercharger 44 to a part thereof downstream of the intercooler 46. The bypass passage 47 bypasses the supercharger 44 and the intercooler 46. An air bypass valve 48 is disposed in the bypass passage 47. The air bypass valve 48 adjusts a flow rate of gas which flows through the bypass passage 47.

The ECU 10 fully opens the air bypass valve 48, when the supercharger 44 is OFF. The intake gas which flows through the intake passage 40 bypasses the supercharger 44 and the intercooler 46 and then reaches the combustion chamber 17 of the engine 1. The engine 1 is operated in a non-boosted state, i.e., a naturally aspirated state.

When the supercharger 44 is ON, the engine 1 is operated in a boosted state. The ECU 10 adjusts an opening of the air bypass valve 48, when the supercharger 44 is ON. A portion of intake gas which passed through the supercharger 44 and the intercooler 46 returns to a location upstream of the supercharger 44 through the bypass passage 47. By the ECU 10 adjusting the opening of the air bypass valve 48, the pressure of the intake gas introduced into the combustion chamber 17 changes. Note that the term "boosted" as used herein may be defined as a state where the pressure inside the surge tank 42 exceeds the atmospheric pressure, and "non-boosted" may be a state where the pressure inside the surge tank 42 becomes the atmospheric pressure or less.

The engine 1 has a swirl generator which generates the swirl flow inside the combustion chamber 17. As illustrated in FIG. 3, the swirl generator has a swirl control valve 56 attached to the intake passage 40. The intake passage 40 has a primary passage 401 connected to the first intake port 181, and a secondary passage 402 connected to the second intake port 182. The swirl control valve 56 is disposed in the secondary passage 402. The swirl control valve 56 is an opening control valve which is capable of choking a cross-section of the secondary passage 402. When the opening of the swirl control valve 56 is small, since a flow rate of the intake air which flows into the combustion chamber 17 from the first intake port 181 is large, and a flow rate of the intake air which flows into the combustion chamber 17 from the second intake port 182 is small, the swirl flow inside the combustion chamber 17 becomes stronger. When the opening of the swirl control valve 56 is large, since the flow rates of the intake air which flows into the combustion chamber 17 from the first intake port 181 and the second intake port 182 become substantially equal to each other, the swirl flow inside the combustion chamber 17 becomes weaker. The swirl flow does not occur when the swirl control valve 56 is fully opened. Note that as illustrated by white arrows in FIG. 3, the swirl flow circles in the counterclockwise direction.

As described above, since the intake port 18 of the engine 1 is the tumble port, when the swirl control valve 56 is closed, an oblique swirl flow including a tumble component and a swirl component is generated inside the combustion chamber 17. The oblique swirl flow is a swirl flow which inclines to the center axis X1 of the cylinder 11 (see FIG. 6). An inclined angle of the oblique swirl flow is generally about 45° to a plane perpendicular to the center axis X1. The inclined angle may be set within a range of 30° to 60°.

An exhaust passage 50 is connected to the other side surface of the engine 1. The exhaust passage 50 communicates with the exhaust port 19 of each cylinder 11. Exhaust gas discharged from the combustion chamber 17 flows through the exhaust passage 50. Although detailed illustration is omitted, an upstream part of the exhaust passage 50 branches to each cylinder 11.

An exhaust gas purification system having a plurality of catalytic converters is disposed in the exhaust passage 50. Although illustration is omitted, these catalytic converters are disposed inside an engine bay. An upstream catalytic converter has a three-way catalyst 511 and a GPF (Gasoline Particulate Filter) 512. A downstream catalytic converter has a three-way catalyst 513. Note that the exhaust gas purification system is not limited to the illustrated configuration. For example, the GPF may be omitted. Moreover, the catalytic converter is not limited to what has the three-way catalyst. Further, the disposed order of the three-way catalyst and the GPF may be changed suitably.

An EGR passage 52 is connected between the intake passage 40 and the exhaust passage 50. The EGR passage 52 is a passage which recirculates a portion of exhaust gas to the intake passage 40. An upstream end of the EGR passage 52 is connected to a part of the exhaust passage 50 between the two catalytic converters. A downstream end of the EGR passage 52 is connected to a part of the intake passage 40 upstream of the supercharger 44.

A water-cooled EGR cooler 53 is disposed in the EGR passage 52. The EGR cooler 53 cools exhaust gas. An EGR valve 54 is also disposed in the EGR passage 52. The EGR valve 54 adjusts a flow rate of exhaust gas which flows through the EGR passage 52. The EGR valve 54 adjusts a recirculating amount of external EGR gas.

Configuration of Control Device for Engine

The control device for the engine is provided with the ECU (Engine Control Unit) 10. The ECU 10 is one example of a controller. The ECU 10 includes a processor 101, memory 102, and an I/F circuit 103, as illustrated in FIG. 4. The processor 101 executes a program. The memory 102 stores the program and data. For example, the memory 102 is comprised of RAM (Random Access Memory) and/or ROM (Read Only Memory). The I/F circuit 103 outputs and inputs an electric signal.

As illustrated in FIGS. 1 and 4, various kinds of sensors SW1-SW11 are connected to the ECU 10. The sensors SW1-SW11 output a signal to the ECU 10. The sensors include the following sensors.

An airflow sensor SW1 measures a flow rate of fresh air which flows through the intake passage 40. The airflow sensor SW1 is disposed at a part of the intake passage 40 downstream of the air cleaner 41. A first intake air temperature sensor SW2 measures a temperature of the fresh air which flows through the intake passage 40. The first intake air temperature sensor SW2 is disposed at a part of the intake passage 40 downstream of the air cleaner 41. A second intake air temperature sensor SW3 measures a temperature of intake gas introduced into the combustion chamber 17. The second intake air temperature sensor SW3 is attached to the surge tank 42. An intake pressure sensor SW4 measures a pressure of the intake gas introduced into the combustion chamber 17. The intake pressure sensor SW4 is attached to the surge tank 42. An in-cylinder pressure sensor SW5 measures a pressure inside each combustion chamber 17. The in-cylinder pressure sensor SW5 is attached to the cylinder head 13 for each cylinder 11. A water temperature sensor SW6 measures a temperature of coolant. The water temperature sensor SW6 is attached to the engine 1. A crank angle sensor SW7 measures a rotation angle of the crankshaft 15. The crank angle sensor SW7 is attached to the engine 1. An accelerator opening sensor SW8 measures an accelerator opening corresponding to an operating amount of an accelerator pedal. The accelerator opening sensor SW8 is attached to an accelerator pedal mechanism. An intake cam angle sensor SW9 measures a rotation angle of the intake cam shaft. The intake cam angle sensor SW9 is attached to the engine 1. An exhaust cam angle sensor SW10 measures a rotation angle of the exhaust cam shaft. The exhaust cam angle sensor SW10 is attached to the engine 1. A fuel pressure sensor SW11 measures a pressure of fuel supplied to the injector 6. The fuel pressure sensor SW11 is attached to the common rail 64 of the fuel supply system 61.

The ECU 10 determines the operating state of the engine 1 based on signals from these sensors SW1-SW11. The ECU 10 calculates a controlled amount of each device according to a given control logic. The control logic is stored in the memory 102.

The ECU 10 outputs electric signals according to the controlled amounts to the injector 6, the spark plug 25, the intake electric S-VT 23, the exhaust electric S-VT 24, the fuel supply system 61, the throttle valve 43, the EGR valve 54, the electromagnetic clutch 45 of the supercharger 44, the air bypass valve 48, and the swirl control valve 56.

Concept of SPCCI Combustion

The engine 1 performs combustion by compressed self-ignition when it is in a given operating state for the main purpose of improving fuel efficiency and exhaust emission performance. If the temperature inside the combustion chamber 17 varies before a start of compression, a timing of self-ignition changes largely. Thus, the engine 1 performs SPCCI combustion in which SI combustion and CI combustion are combined.

The SPCCI combustion is the following combustion form. That is, by the spark plug 25 forcibly igniting the mixture gas inside the combustion chamber 17, the mixture gas starts SI combustion by flame propagation. After the SI combustion is started, (1) when the temperature inside the combustion chamber 17 increases by a generation of heat of the SI combustion, and (2) when the pressure inside the combustion chamber 17 increases by flame propagation, unburnt mixture gas carries out CI combustion by self-ignition (see combustion waveforms 1015, 1025, and 1035 in FIG. 10).

By adjusting the combustion amount of SI combustion, the variation in the temperature inside the combustion chamber 17 before compression is started can be absorbed. By the ECU 10 adjusting the ignition timing, the combustion amount of SI combustion is adjusted. When the ECU 10 adjusts the ignition timing, the mixture gas carries out self-ignition at a target timing. In the SPCCI combustion, the combustion amount of SI combustion controls the start timing of CI combustion.

Operating Range of Engine

Figure 5:
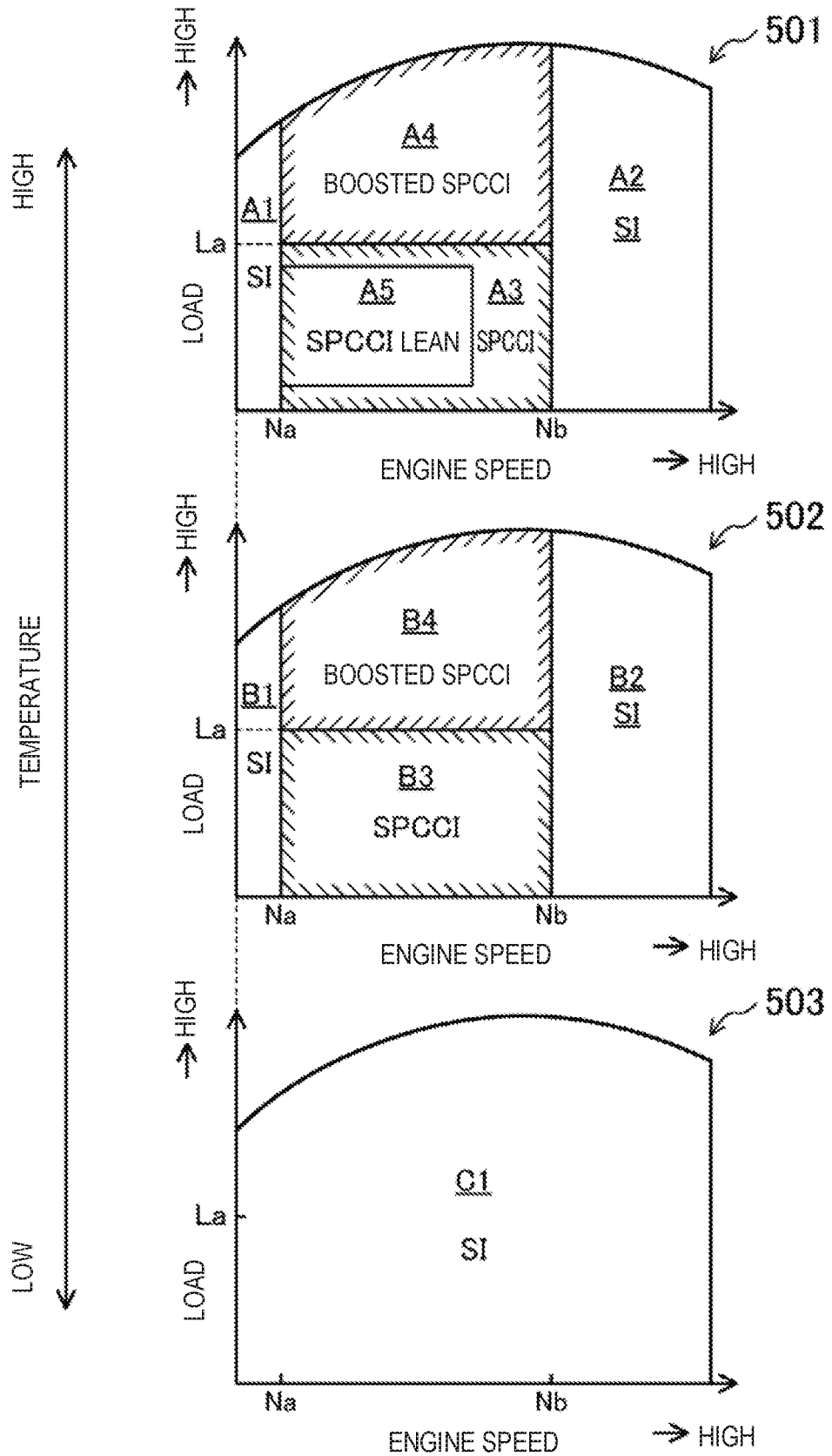
FIG. 5 is a view illustrating control maps for the engine, where an upper part of this figure is a control map when the engine is warm, a middle part of this figure is a control map when the engine is half warm, and a lower part of this figure is a control map when the engine is cold.

FIG. 5 illustrates control maps 501, 502, and 503 of the engine 1. The control maps 501, 502, and 503 are stored in the memory 102 of the ECU 10. The ECU 10 operates the engine 1 based on the control maps 501, 502, and 503. The control map includes three kinds of control maps comprised of a first control map 501, a second control map 502, and a third control map 503. The ECU 10 uses a control map selected from the first control map 501, the second control map 502, and the third control map 503 according to a wall temperature of the combustion chamber 17 (or an engine coolant temperature) and a temperature of intake air, for controlling the engine 1.

The ECU 10 selects the first control map 501 when the wall temperature of the combustion chamber 17 is equal to or greater than a first wall temperature (e.g., 80° C.) and the temperature of intake air is equal to or greater than a first intake air temperature (e.g., 50° C.). The first control map 501 is a map when the engine 1 is warm.

The ECU 10 selects the second control map 502 when the wall temperature of the combustion chamber 17 is less than the first wall temperature and equal to or greater than a second wall temperature (e.g., 30° C.), and the intake air temperature is less than the first intake air temperature and equal to or greater than a second intake air temperature (e.g., 25° C.). The second control map 502 is a map when the engine 1 is half warm. The ECU 10 selects the third control map 503 when the wall temperature of the combustion chamber 17 is less than the second wall temperature or when the intake air temperature is less than the second intake air temperature. The third control map 503 is a map when the engine 1 is cold.

Note that the ECU 10 may select the control maps 501, 502, and 503, for example, based on the temperature of the coolant of the engine 1 measured by the water temperature sensor SW6, instead of the wall temperature of the combustion chamber 17. Moreover, the ECU 10 may estimate the wall temperature of the combustion chamber 17 based on various kinds of measurement signals. The intake air temperature is measured by the second intake air temperature sensor SW3. Moreover, the ECU 10 may estimate the intake air temperature based on various kinds of measurement signals.

Each of the maps 501, 502, and 503 is defined based on the engine load and the engine speed. The first control map 501 is divided into five ranges comprised of a range A1, a range A2, a range A3, a range A4, and a range A5. The range A1 is a range where the engine speed is lower than a speed Na. Idle operation of the engine 1 is included in the range A1. The range A2 is a range where the engine speed is higher than a speed Nb. The range A3 is a range where the engine load is lower than a load La and the engine speed is from Na to Nb. The range A4 is a range where the engine load is equal to or higher than La and the engine speed is from Na to Nb. Note that La may be half of the maximum load of the engine 1. The range A5 is a specific partial range of the range A3 on a low-load side. The range A5 corresponds to the low-speed and low-load specific partial range in the entire operating range of the engine 1. Note that the term "low speed" as used herein corresponds to a low-speed side when bisecting the entire operating range of the engine 1 into the low-speed side and the high-speed side. The term "low load" as used herein corresponds to the low-load side when bisecting the entire operating range of the engine 1 into the low-load side and the high-load side.

When the operating state determined based on the engine load and the engine speed is in the range A1, the ECU 10 controls the engine 1 to perform SI combustion. Note that an air-fuel ratio of the mixture gas is a stoichiometric air-fuel ratio or the substantially stoichiometric air-fuel ratio. The air-fuel ratio of the mixture gas may be fallen within a purification window of the three-way catalysts 511 and 513. Note that the air-fuel ratio is an average air-fuel ratio throughout the combustion chamber 17. Also when the operating state of the engine 1 is in the range A2, the ECU 10 controls the engine 1 to perform SI combustion. Note that the air-fuel ratio of the mixture gas is the stoichiometric air-fuel ratio or the substantially stoichiometric air-fuel ratio.

When the operating state of the engine 1 is in the range A3, the ECU 10 controls the engine 1 to perform SPCCI combustion. Note that the air-fuel ratio of the mixture gas is the stoichiometric air-fuel ratio or the substantially stoichiometric air-fuel ratio. Moreover, the supercharger 44 is OFF when the operating state of the engine 1 is in the range A3. When the operating state of the engine 1 is in the range A4, the ECU 10 controls the engine 1 to perform SPCCI combustion. Note that the air-fuel ratio of the mixture gas is the stoichiometric air-fuel ratio or the substantially stoichiometric air-fuel ratio. Moreover, the supercharger 44 is ON when the operating state of the engine 1 is in the range A4.

When the operating state of the engine 1 is in the range A5, the ECU 10 controls the engine 1 to perform SPCCI combustion. Note that the air-fuel ratio of mixture gas is leaner than the stoichiometric air-fuel ratio. In detail, the average air-fuel ratio throughout the combustion chamber 17 is 30:1 or greater and 40:1 or less. The supercharger 44 is OFF when the operating state of the engine 1 is in the range A5. Moreover, when the operating state of the engine 1 is in the range A5, the ECU 10 establishes the overlap period during which both the intake valve 21 and the exhaust valve 22 open. Internal EGR gas is introduced into the combustion chamber 17. Therefore, the temperature inside the combustion chamber 17 increases. In the range A5 where the engine load is low, the CI combustion of the SPCCI combustion becomes stable because the temperature inside the combustion chamber 17 is high. Note that, below, the range A5 is referred to as the "SPCCI lean range A5." Details of the fuel injection control when the operating state of the engine 1 is in the SPCCI lean range A5 will be described later.

The second control map 502 is divided into four ranges comprised of a range B1, range B2, a range B3, and a range B4. The range B1 is a range where the engine speed is a lower than Na and corresponds to the range A1 of the first control map 501. The range B2 is a range where the engine speed is higher than Nb and corresponds to the range A2 of the first control map 501. The range B3 is a range where the engine speed is from Na to Nb and the engine load is lower than La, and corresponds to the range A3 of the first control map 501. The range B4 is a range where the engine speed is from Na to Nb and the engine load is equal to or higher than La, and corresponds to the range A4 of the first control map 501. The second control map 502 does not have a range corresponding to the range A5 of the first control map 501. That is because the SPCCI combustion of the lean mixture gas becomes unstable when the temperature is low.

When the operating state of the engine 1 is in the range B1, the ECU 10 controls the engine 1 to perform SI combustion. Note that the air-fuel ratio of the mixture gas is the stoichiometric air-fuel ratio or the substantially stoichiometric air-fuel ratio. Also when the operating state of the engine 1 is in the range B2, the ECU 10 controls the engine 1 to perform SI combustion. Note that the air-fuel ratio of the mixture gas is the stoichiometric air-fuel ratio or the substantially stoichiometric air-fuel ratio. When the operating state of the engine 1 is in the range B3, the ECU 10 controls the engine 1 to perform SPCCI combustion. Note that the air-fuel ratio of mixture gas is the stoichiometric air-fuel ratio or the substantially stoichiometric air-fuel ratio. Moreover, the supercharger 44 is OFF when the operating state of the engine 1 is in the range B3. When the operating state of the engine 1 is in the range B4, the ECU 10 controls the engine 1 to perform SPCCI combustion. Note that the air-fuel ratio of the mixture gas is the stoichiometric air-fuel ratio or the substantially stoichiometric air-fuel ratio. Moreover, the supercharger 44 is ON when the operating state of the engine 1 is in the range B4.

The third control map 503 has only a range C1. The range C1 extends throughout the operating range of the engine 1. When the operating state of the engine 1 is in the range C1, the ECU 10 controls the engine 1 to perform SI combustion. Note that the air-fuel ratio of the mixture gas is the stoichiometric air-fuel ratio or the substantially stoichiometric air-fuel ratio.

Basic Control of Fuel Injection

As described above, when the operating state of the engine 1 is in the SPCCI lean range A5, the engine 1 carries out SPCCI combustion of the mixture gas which is leaner than the stoichiometric air-fuel ratio. It is desirable to form the rich portion of mixture gas near the spark plug 25 and the lean portion of mixture gas therearound at a timing when the spark plug 25 performs ignition. Thus, the spark plug 25 can stably ignite the rich mixture gas, and the lean unburnt mixture gas can stably carry out self-ignition. The air-fuel ratio A/F of the rich mixture gas is 20:1 or greater and 35:1 or less, and the A/F of the lean mixture gas is 35:1 or greater and 50:1 or less.

Then, when the operating state of the engine 1 is in the SPCCI lean range A5, the engine 1 forms a first area where the mixture gas is lean and a second area where the mixture gas is rich inside the combustion chamber 17 by utilizing the swirl flow. Note that the first area is homogeneous or substantially homogeneous. Note that in the following description, the term "homogeneous" includes both the concepts of "homogeneous" and "substantially homogeneous." When the operating state of the engine 1 is in the SPCCI lean range A5, the ECU 10, for example, fully closes the swirl control valve 56.

Figure 6:
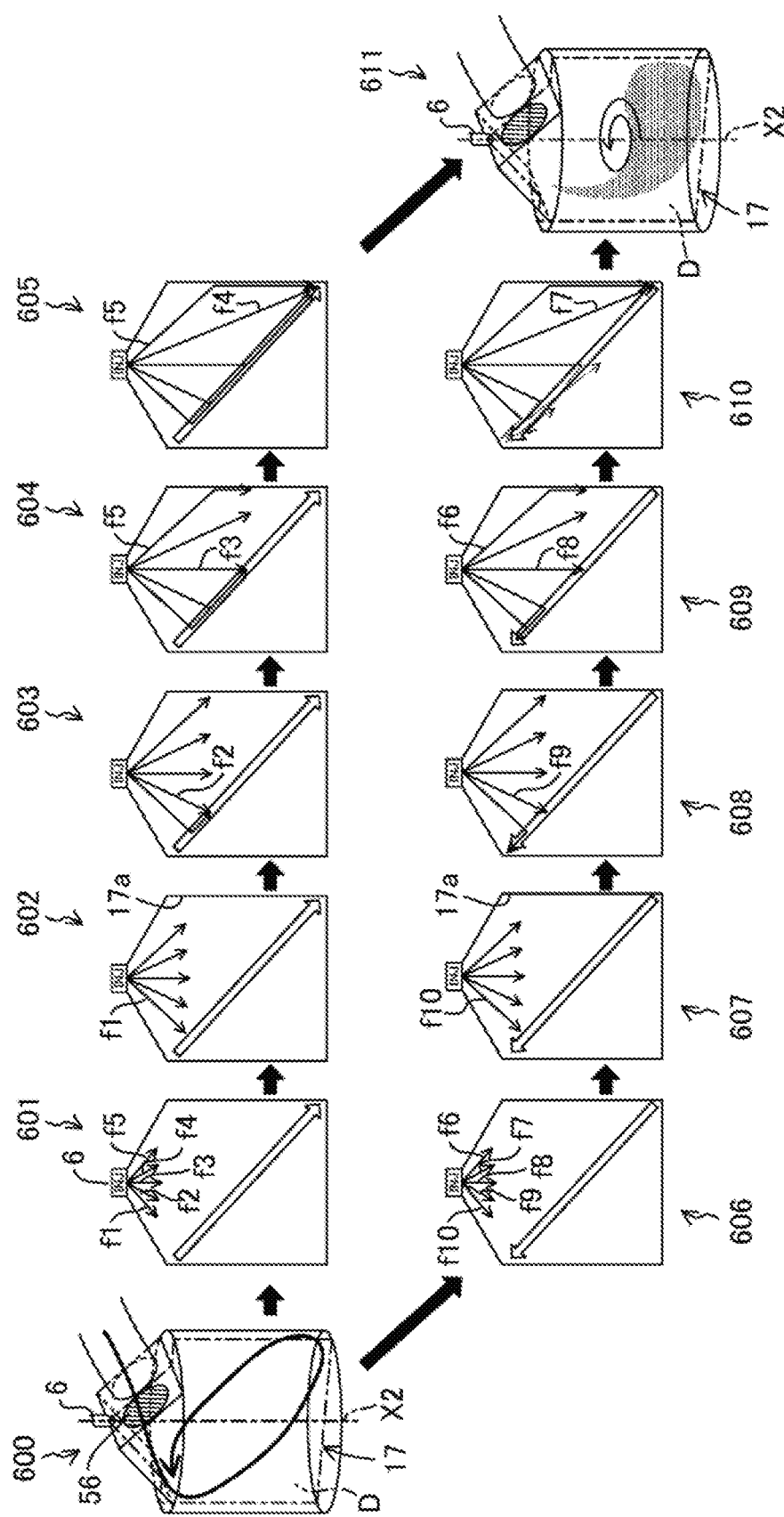
FIG. 6 is a diagram illustrating a formation of a mixture gas utilizing a swirl flow.

FIG. 6 illustrates a situation in which atomized fuel injected into the combustion chamber 17 flows so as to be carried by the swirl flow. The figure at Step 600 at the left end of FIG. 6 is a view illustrating the inside of the combustion chamber 17 before the injector 6 injects fuel. As illustrated by an arrow in this figure, the oblique swirl flow including the tumble component and the swirl component occurs inside the combustion chamber 17. The oblique swirl flow passes through an upper part of the combustion chamber 17 on the exhaust side, and largely circles on the front side of the engine 1 obliquely downward. The oblique swirl flow also passes through a lower part of the combustion chamber 17 on the intake side, largely circles on the rear side of the engine 1 obliquely upward, and then returns to the upper part of the combustion chamber 17 on the exhaust side.

A reference character "D" indicates a vertical cross-section which is formed by bisecting the inside of the combustion chamber 17 in the front-and-rear direction of the engine 1. The figures at Steps 601-605 of FIG. 6 illustrate a temporal change in the atomized fuel spray inside the combustion chamber 17 on the front side of the engine 1 with respect to the vertical cross-section D. The figures at Steps 606-610 illustrate a temporal change in the atomized fuel spray inside the combustion chamber 17 on the rear side of the engine 1 with respect to the vertical cross-section D. A white arrow in each figure indicates the mainstream of the oblique swirl flow.

The figure at Step 601 illustrates the inside of the combustion chamber 17 immediately after the injector 6 injects fuel. The injector 6 injects five atomized fuel sprays f1-f5 simultaneously with atomized fuel sprays f6-f10. The atomized fuel spray f1 has the shortest distance from the nozzle hole to the swirl flow. As illustrated in the figure at Step 602, the atomized fuel spray f1 first reaches the swirl flow.

As illustrated in the figure at Step 603, the atomized fuel spray f2 then reaches the swirl flow. The atomized fuel spray f2 reaches a position downstream of the position at which the atomized fuel spray f1 reached the swirl flow. By the time the atomized fuel spray f2 reaches the swirl flow, the atomized fuel spray f1 moves on with the swirl flow. The atomized fuel spray f1 and the atomized fuel spray f2 merge together. Then, as illustrated in the figure at Step 604, the atomized fuel spray f3 reaches the swirl flow. By the time the atomized fuel spray f3 reaches the swirl flow, the atomized fuel sprays f1-f2 move with the swirl flow. The atomized fuel sprays f1-f3 get together.

Then, as illustrated in the figure at Step 605, the atomized fuel spray f4 reaches the swirl flow. By the time the atomized fuel spray f4 reaches the swirl flow, the atomized fuel sprays f1-f3 move on with the swirl flow. The atomized fuel spray f1-f4 merge together.

In the example of FIG. 6, the atomized fuel spray f5 reaches a wall surface 17a of the combustion chamber 17. As illustrated in the figure at Step 604, the atomized fuel spray f5 reaches the wall surface 17a and then moves downwardly along the wall surface 17a. Then, as illustrated in the figure at Step 605, the atomized fuel spray f5 also reaches the swirl flow. The atomized fuel spray f5 joins the atomized fuel sprayss f1-f4.

A plurality of atomized fuel sprays f1-f5 injected from the injector 6 approach each other by the swirl flow. As a result, the mixture gas of which a fuel concentration is dense is formed locally.

On the other hand, the figure at Step 606 also illustrates the inside of the combustion chamber 17 immediately after the injector 6 injects fuel. The atomized fuel spray f10 has the shortest distance from the nozzle hole to the swirl flow. As illustrated in the figure at Step 607, the atomized fuel spray f10 first reaches the swirl flow.

Then, as illustrated in the figure at Step 608, the atomized fuel spray f9 reaches the swirl flow. The atomized fuel spray f9 reaches a position upstream of the position at which the atomized fuel spray f10 reached the swirl flow. By the time the atomized fuel spray f9 reaches the swirl flow, the atomized fuel spray f10 moves on with the swirl flow. The atomized fuel spray f10 separates from the atomized fuel spray f9. Even if the atomized fuel spray f9 moves on with the swirl flow, since the atomized fuel spray f10 also moves on with the swirl flow, the atomized fuel spray f9 and the atomized fuel spray f10 maintain a state where they are separated from each other.

Then, as illustrated in the figure at Step 609, the atomized fuel spray f8 reaches the swirl flow. The atomized fuel sprays f10-f9 move on with the swirl flow. The atomized fuel sprays f10-f8 separate from each other.

A plurality of atomized fuel sprays f10-f8 injected from the injector 6 separate from each other by the swirl flow. As a result, the mixture gas of which the fuel concentration is sparse is formed widely.

Then, as illustrated in the figure at Step 610, the atomized fuel spray f7 reaches the swirl flow. The atomized fuel spray f7 joins the atomized fuel sprays f1-f5 described above in this example.

As illustrated in the figure at Step 609, the atomized fuel spray f6 reaches the wall surface 17a of the combustion chamber 17, and then moves downwardly along the wall surface 17a. Then, as illustrated in the figure at Step 610, the atomized fuel spray f6 reaches the swirl flow. The atomized fuel spray f6 joins the atomized fuel sprays f1-f5. Among the atomized fuel spray f1-f10 injected from the injector 6, the atomized fuel sprays f1-f7 get together and the atomized fuel sprays f8-f10 separate from each other. In the example of FIG. 6, about 70% of the fuel injected from the injector 6 merges together, and about 30% is spread.

The figure at Step 611 at the right end of FIG. 6 illustrates the inside of the combustion chamber 17 immediately after all the fuel injected from the injector 6 reaches the swirl flow. The first area and the second area where the mixture gas is richer than the mixture gas in the first area are formed inside the combustion chamber 17. The first area and the second area move in the circumferential direction inside the combustion chamber 17 by the swirl flow.

Figure 7:
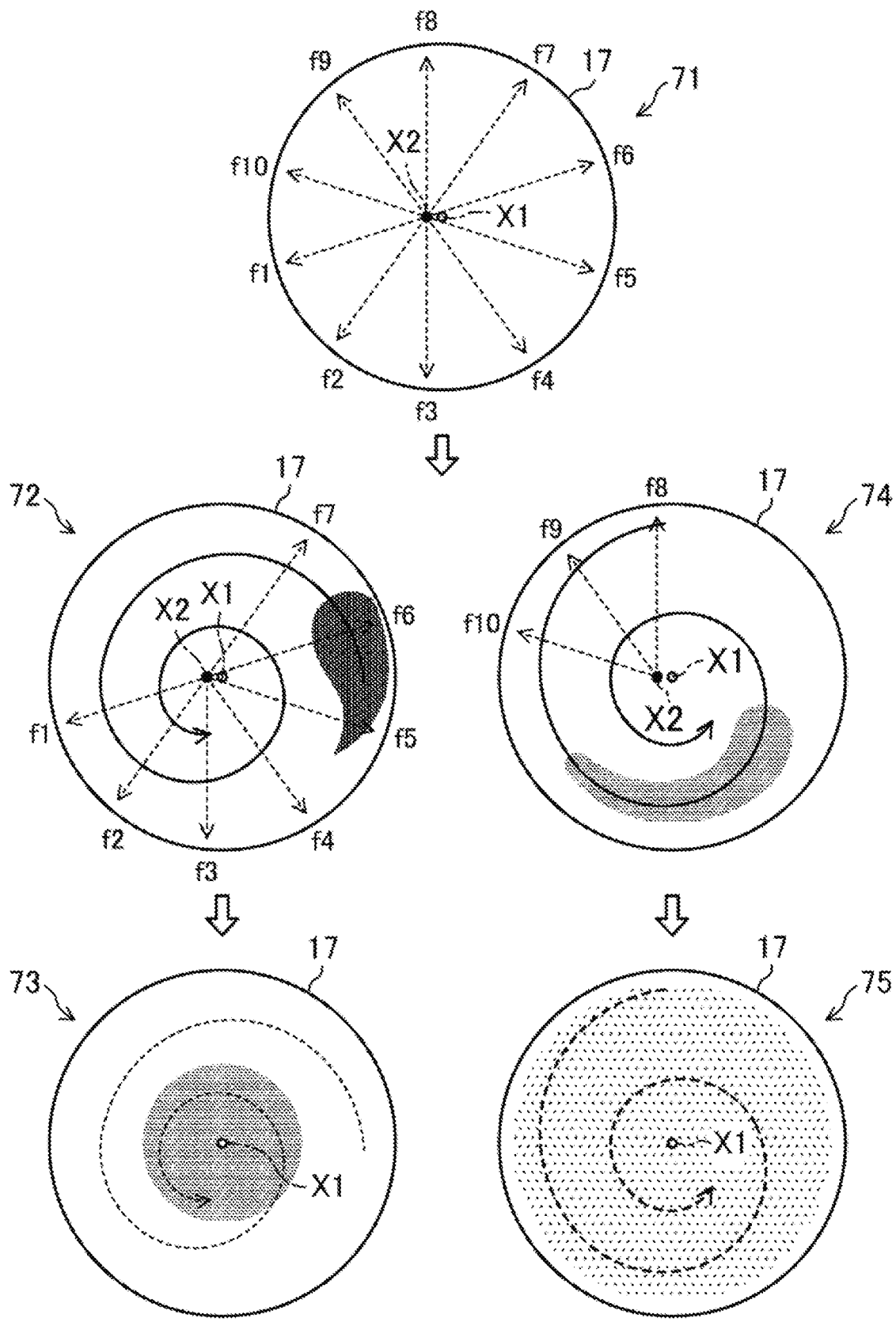
FIG. 7 is a diagram illustrating the formation of the mixture gas utilizing the swirl flow.

FIG. 7 illustrates views of the inside of the combustion chamber 17 seen from above. FIG. 7 illustrates a temporal change in mixture gas inside the combustion chamber 17. The swirl flow generated inside the combustion chamber 17 during an intake stroke is gradually attenuated as the compression stroke progresses. The mixture gas riding on and moving with the swirl flow goes toward the central part of the combustion chamber 17, while being spread gradually.

As illustrated in the figure at Step 71 of FIG. 7, when the injector 6 radially injects the atomized fuel sprays f1-f10, the atomized fuel sprays f1-f7 merge together and form the second area where the mixture gas is rich, as illustrated by dots in the figure at Step 72. The second area moves to the central part of the combustion chamber 17 at the timing when the spark plug 25 performs ignition as illustrated in the figure at Step 73 by riding on and moving with the swirl flow. Thus, the area where the mixture gas is rich is formed near the spark plug 25.

The first area where the homogeneous mixture gas is formed by dispersing the atomized fuel sprays f8-f10 as illustrated by dots in the figure at Step 74 is further dispersed by moving with the swirl flow, as illustrated by an arrow. As illustrated in the figure at Step 75, the first area disperses throughout the combustion chamber 17 at the timing when the spark plug 25 performs ignition.

Thus, at the timing when the spark plug 25 performs ignition, the second area of mixture gas illustrated in the figure at Step 73 and the first area of the mixture gas illustrated in the figure at Step 75 overlap with each other. Therefore, the second area where the mixture gas is relatively rich is formed near the spark plug 25, and the first area where the mixture gas is relatively homogeneous and lean is formed around the second area.

In order to realize the mixture gas formation described above, the pressure of fuel may be set as 30 MPa or greater and 120 MPa or less. If the pressure of fuel falls below 30 MPa, the atomized fuel spray may not reach the swirl flow because the power of the injected fuel is too weak. If the pressure of fuel exceeds 120 MPa, the atomized fuel spray may penetrate the swirl flow because the power of the injected fuel is too strong. If the pressure of fuel is within a range of 30 MPa or greater and 120 MPa or less, the atomized fuel spray can move on with the swirl flow. As described above, the atomized fuel sprays merge together or disperse by the swirl flow.

Moreover, in order to realize the mixture gas formation described above, it is desirable that the swirl flow is comparatively strong. According to the examination of the present inventors, it is found that the mixture gas formation described above is realizable, if a swirl ratio is 2:1 or greater. Here, the term "swirl ratio" as used herein refers to a value obtained by dividing an integrated value of measurements of an intake air flow transverse direction angular velocity for every valve lift by an engine angular velocity. Note that although illustration is omitted, the intake air flow transverse direction angular velocity can be calculated based on measurements using a rig test device. The swirl ratio becomes about 6:1 when the engine 1 fully closes the swirl control valve 56. Therefore, when the operating state of the engine 1 is in the SPCCI lean range A5, the swirl ratio may be 2:1 or greater and 6:1 or less. When the opening of the swirl control valve 56 is adjusted within a range where an opening ratio becomes 0-15%, the swirl ratio becomes 2:1 or greater and 6:1 or less.

Fuel Injection Control of SPCCI Lean Range

As described above, when the swirl flow is utilized, the areas of the mixture gas where the fuel concentration is different can be distributed inside the combustion chamber 17. Therefore, the SPCCI combustion is stabilized, thereby improving the fuel efficiency and the exhaust emission performance of the engine 1.

However, the present inventors noticed that a discharge amount of NOx may increase when the mixture gas formation is performed by utilizing the swirl flow. It can be considered that the area where the mixture gas is excessively rich is locally formed inside the combustion chamber 17.

Figure 8:
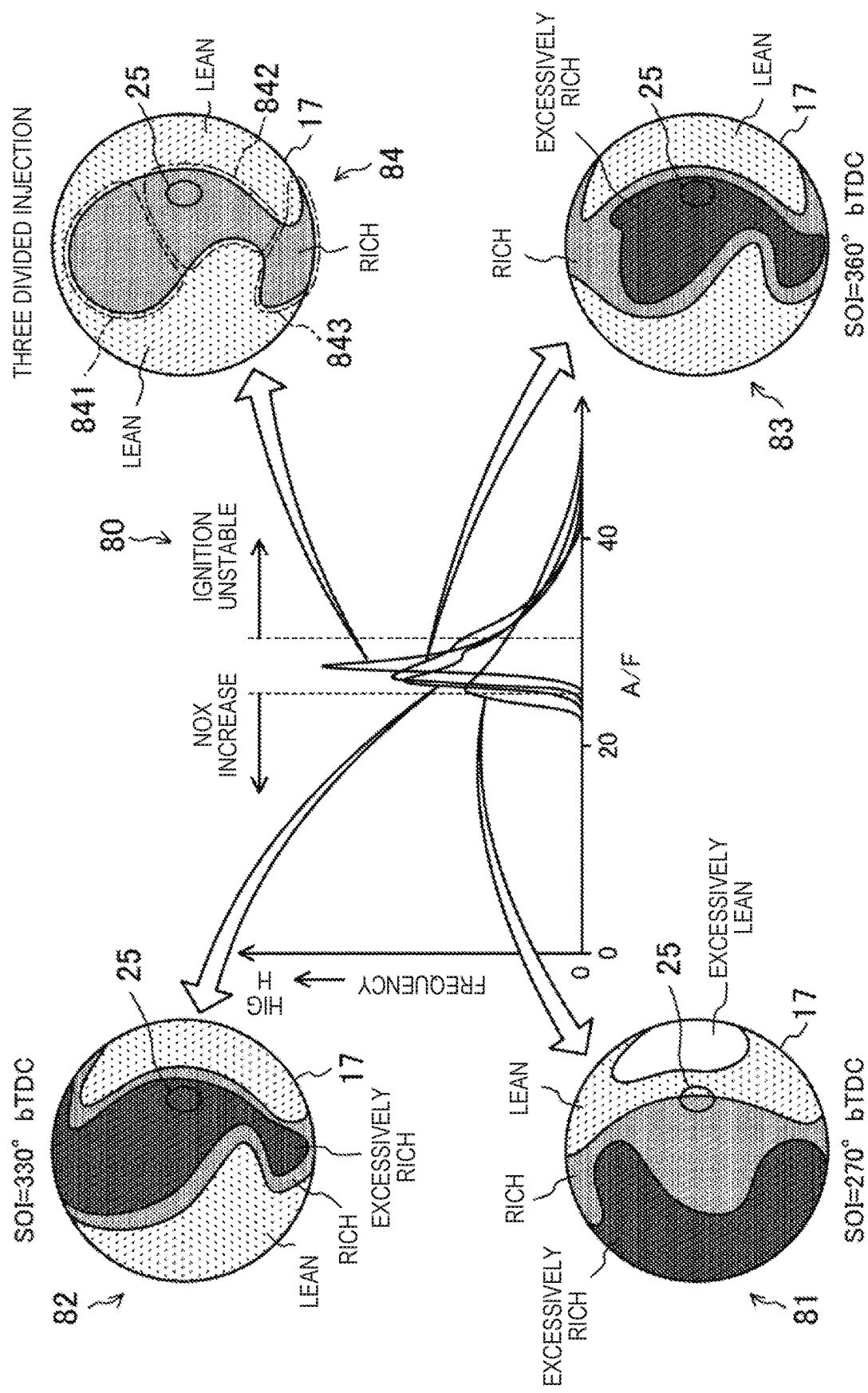
FIG. 8 is a graph illustrating a relationship between an air-fuel ratio and a frequency distribution of the air-fuel ratio when an injection mode of fuel is changed, and contour diagrams of concentration distributions of fuel inside the combustion chamber.

FIG. 8 illustrates distributions of the air-fuel ratio of mixture gas inside the combustion chamber 17. A graph 80 at the center of FIG. 8 is a frequency distribution of the air-fuel ratio. The horizontal axis is the air-fuel ratio, where the mixture gas is leaner as it goes to the right, and the mixture gas is richer as it goes to the left. Moreover, the vertical axis of the graph 80 is a frequency of the mixture gas of the air-fuel ratio. Moreover, each of contour diagrams 81-84 in FIG. 8 illustrates a concentration distribution of fuel inside the combustion chamber 17 at an ignition timing. The contour diagrams 81-84 in FIG. 8 are results of simulations which are performed while changing the injection timing of fuel.

The contour diagram 81 at the lower left of FIG. 8 is a contour diagram when the entire amount of fuel required per cycle is injected at once in the second half of an intake stroke. A start timing of injection (SOI) is 270° bTDC. As illustrated in this figure, when the injection timing of fuel is late, a range where fuel is excessively rich exists in the perimeter part of the combustion chamber 17 at the ignition timing. As illustrated in the graph 80 of FIG. 8, when the injection timing of fuel is late, there is more excessively rich mixture gas. In this case, since the combustion temperature becomes higher, the discharge amount of $NO_x$ may increase. Note that in the SPCCI lean range, since the average air-fuel ratio throughout the combustion chamber 17 is leaner than the stoichiometric air-fuel ratio, the three-way catalyst cannot purify NOx discharged from the combustion chamber 17. As illustrated by a broken line in the graph 80 of FIG. 8, in order to reduce the discharge of NOx from the combustion chamber 17, it is desirable that the A/F is 25:1 or greater, for example. Moreover, in the SPCCI combustion, in order for the spark plug 25 to stably ignite the mixture gas, it is desirable that the A/F is 30:1 or less, for example.

When the injection timing of fuel is advanced, a period of time from fuel being injected into the combustion chamber 17 to the ignition becomes longer. When the period of time from the injection to the ignition is long, it is expected that the excessively rich mixture gas decreases because the fuel disperses in the meantime.

The contour diagram 82 at the upper left of FIG. 8 is a contour diagram when the start of injection timing of fuel is advanced to 330° bTDC, and the contour diagram 83 of the lower right is a contour diagram when the start of injection timing of fuel is advanced to 360° bTDC. Note that, also in the examples of the contour diagrams 82 and 83, the injector 6 injects the entire amount of fuel required per cycle by a single injection, similar to the example of contour diagram 81.

As is apparent from this figure, when the start of injection is advanced, the area of the mixture gas where fuel is excessively rich moves to the central part of the combustion chamber 17. However, the area of the mixture gas where fuel is excessively rich still exists inside the combustion chamber 17. From these results, it is found that the discharge amount of $NO_x$ cannot be reduced only by advancing the start timing of fuel injection.

As a result of repeated examinations while changing injection parameters variously, the present inventors found that the discharge amount of $NO_x$ is decreased when the injector 6 injects the entire amount of fuel required per cycle dividedly in a plurality of steps during an intake stroke.

The contour diagram 84 at the upper right of FIG. 8 is a contour diagram when the injector 6 injects fuel dividedly in 3 steps comprised of a first injection, a second injection, and a third injection. The start timing of the first injection is 336° bTDC, the start timing of the second injection is 275° bTDC, and the start timing of the third injection is 215° bTDC. The injector 6 sequentially performs the first injection, the second injection, and the third injection so as to have an interval between the injections. In this example, the injector 6 injects about 60% of the entire required amount of fuel as the first injection, about 30% of the fuel as the second injection, and about 10% of the fuel as the third injection.

As is apparent from this figure, the range where fuel is excessively rich is eliminated when the injector 6 performs the divided injections during an intake stroke. Since the combustion temperature falls, the discharge of $NO_x$ can be reduced. Moreover, the fuel concentration of mixture gas is relatively high near the spark plug 25. The spark plug 25 can stably ignite the rich mixture gas. Therefore, the SI combustion is stabilized. The fuel concentration of the mixture gas around the area where the mixture gas is rich is relatively low. The lean mixture gas carries out self-ignition at a suitable timing after the SI combustion is started.

Moreover, as illustrated in the graph 80 of FIG. 8, when the injector 6 performs the divided injections during an intake stroke, a frequency peak is fallen within a range where the A/F is 25:1 or greater and 30:1 or less. Since the mixture gas is not excessively rich, the discharge of $NO_x$ is reduced, and since the mixture gas is not excessively lean, the ignitability of the mixture gas becomes appropriate. As a result, the SPCCI combustion becomes stable.

When the divided injections are performed toward the swirl flow during an intake stroke, the first area and the second area where the mixture gas is richer than the mixture gas in the first area are formed in each injection, as illustrated in FIGS. 6 and 7. Since the injection amount per injection is small, the mixture gas in the second area will not excessively be rich.

The second area formed by each injection moves on with the swirl flow. By sequentially performing the three injections with the interval therebetween, the areas formed by the injections do not overlap with each other. As illustrated by one-dot chain lines in the contour diagram 84, the positions of second areas 841, 842, and 843 formed by the first injection, the second injection, and the third injection are offset from each other. The second areas 841, 842, and 843 do not overlap with each other. Thus, when the plurality of fuel injections are performed with the interval therebetween, the area where the mixture gas is excessively rich is eliminated or is reduced in size. Therefore, the discharge of $NO_x$ can be reduced while the engine 1 operates in the SPCCI lean range A5. Moreover, the area where the fuel concentration of the mixture gas is moderate can be formed near the spark plug 25, without dispersing the lean mixture gas inside the entire combustion chamber 17. Therefore, the SPCCI combustion is stabilized.

Control of Engine in SPCCI Lean Range

Figure 9:
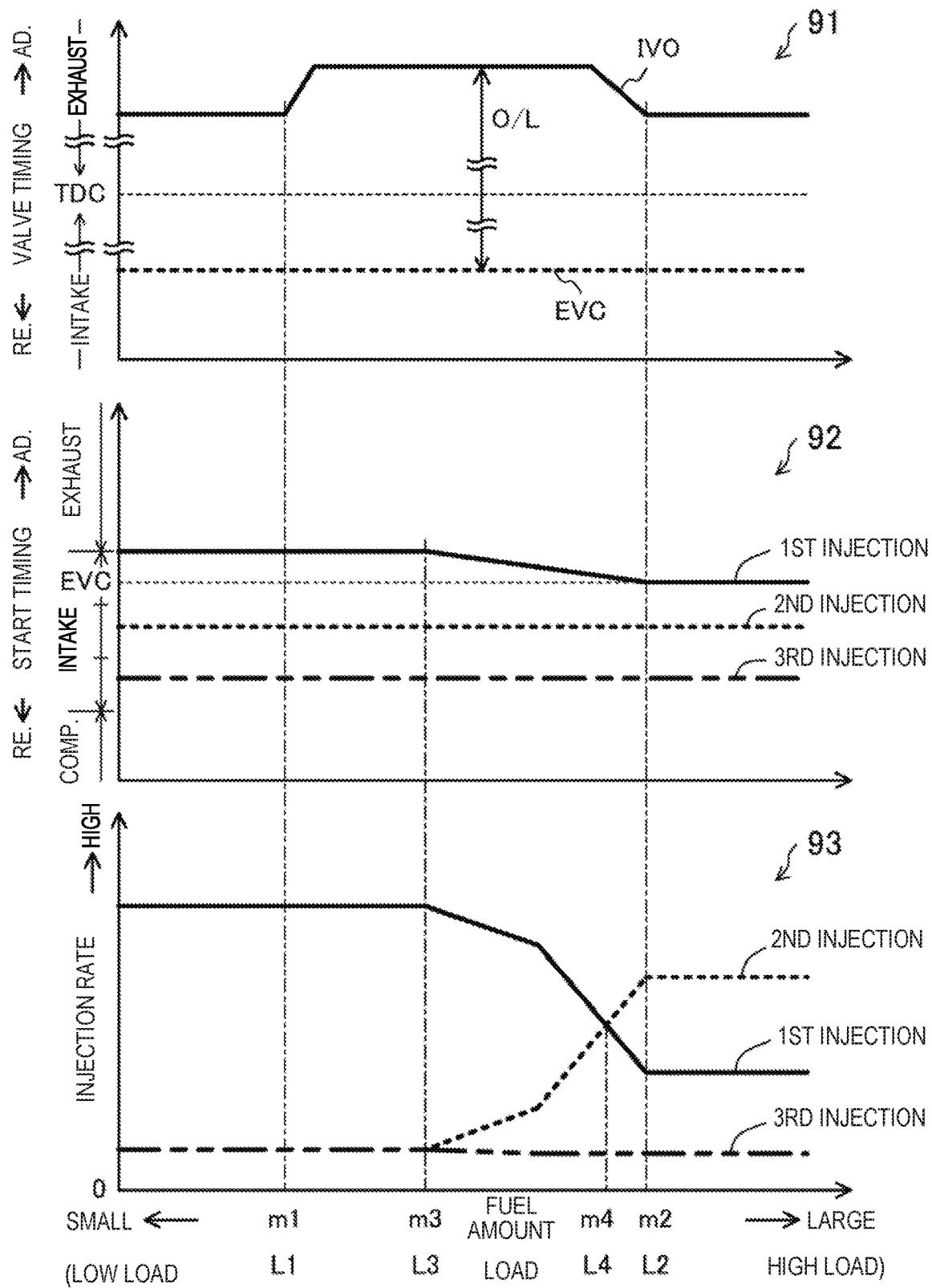
FIG. 9 shows maps with respect to a change in a fuel amount, where an upper part of this figure is a map of an open timing of an intake valve and a close timing of an exhaust valve, a middle part of this figure is a map of start timings of a first injection, a second injection, and a third injection, and a lower part of this figure is a map of an injection ratio of the first injection, the second injection, and the third injection.

FIG. 9 is a view illustrating a map 91 of the valve timings of the intake valve 21 and the exhaust valve 22, a map 92 of the fuel injection timings, and a map 93 of the injection ratio of fuel, when the operating state of the engine 1 is in the SPCCI lean range A5. The horizontal axis of FIG. 9 is the fuel amount, and the fuel amount is an amount of fuel required per cycle. The amount of fuel increases as the engine load becomes higher, and, on the other hand, the amount of fuel decreases as the engine load becomes lower. Therefore, the horizontal axis of FIG. 9 corresponds to the load of the engine 1. The engine load is higher as it goes to the right side of FIG. 9, and, on the other hand, the engine load is lower as it goes to the left side.

As described above, when the operating state of the engine 1 is in the SPCCI range A5, the ECU 10 establishes, through the intake electric S-VT 23 and the exhaust electric S-VT 24, the overlap period during which both the intake valve 21 and the exhaust valve 22 open (see the map 91). The intake valve 21 opens during an exhaust stroke, and the exhaust valve 22 closes during an intake stroke.

The close timing of the exhaust valve 22 (EVC) is fixed, even if the fuel amount changes. The open timing of the intake valve 21 (IVO) changes as the fuel amount changes. In detail, when the fuel amount is less than a first injection amount m1, the open timing of the intake valve 21 is late. The overlap period is short. When the overlap period is short, the amount of EGR gas introduced into the combustion chamber 17 is small. When the engine load is less than a first load L1 and the amount of fuel is small, if a large amount of EGR gas is introduced into the combustion chamber 17, the SPCCI combustion may become unstable. When the amount of EGR gas is small, the combustion stability of the engine 1 improves.

When the fuel amount is the first injection amount m1 or more and less than a second injection amount m2, the open timing of the intake valve 21 is early. The overlap period is long. For example, the overlap period is 70° CA. When the overlap period is long, a large amount of EGR gas is introduced into the combustion chamber 17. Since the temperature inside the combustion chamber 17 is high, the SPCCI combustion is stabilized.

When the fuel amount is the second injection amount m2 or more, the open timing of the intake valve 21 is late. The overlap period is short. A small amount of EGR gas is introduced into the combustion chamber 17. When the engine load is a second load L2 or higher, the temperature inside the combustion chamber 17 is high because the amount of fuel is large. By reducing the amount of EGR gas when the temperature inside the combustion chamber 17 is high, it is reduced that the temperature inside the combustion chamber 17 becomes excessively high. Therefore, abnormal combustion can be reduced.

As described above, the injector 6 performs three fuel injections comprised of the first injection, the second injection, and the third injection, during an intake stroke. As illustrated in the map 92 of FIG. 9, the injector 6 starts the first injection in an early period of the intake stroke, starts the second injection in a middle period of the intake stroke, and starts the third injection in a late period of the intake stroke. Here, an intake stroke is divided equally into the three periods with respect to the crank angle. As described above, by sequentially performing the first injection, the second injection, and the third injection with an interval therebetween, the range where the fuel concentration is excessively rich is eliminated, and the range where the fuel concentration of the mixture gas is moderate is formed near the spark plug 25.

In more detail, when the fuel amount is less than a third injection amount m3 (here, m1<m3), the injector 6 starts the first injection, for example, at 360° bTDC, starts the second injection, for example, at 275° bTDC, and starts the third injection, for example, at 215° bTDC. When the engine load is less than a third load L3, the start timings of the first injection, the second injection, and the third injection are maintained, even if the engine load changes. Therefore, the formation of the area where the mixture gas is excessively rich can be prevented. When the engine load is low, the discharge amount of $NO_x$ can be kept low.

When the engine load increases and the injection amount becomes the third injection amount m3 or more, the ECU 10 retards the start timing of the first injection. The start timing of the first injection is delayed as the injection amount increases. That is, the start timing of the first injection is retarded as the engine load increases. The gas flow inside the combustion chamber 17 becomes stronger in connection with an increase in the speed of the piston 3 as the intake stroke progresses. The swirl flow also becomes stronger as the intake stroke progresses. When the start timing of the first injection is retarded, the injector 6 can inject fuel into the combustion chamber 17 where the gas flow is strong. Therefore, it becomes advantageous for dispersing fuel, and the excessively rich mixture gas is prevented from forming locally.

When the engine load further increases and the injection amount becomes the second injection amount m2 or more, the ECU 10 sets the start timing of the first injection as a given value. The start timing of the first injection is maintained, even if the injection amount increases. The start timing of the first injection is set at or after the close timing of the exhaust valve 22 (EVC). If the first injection is performed during the overlap period when the engine load is high, a portion of fuel injected from the injector 6 flows into the intake passage 40 and/or the exhaust passage 50. Thus, when the engine load is high, the ECU 10 delays the start timing of the first injection to a timing after the overlap period ends. The fuel injected from the injector 6 into the combustion chamber 17 stays inside the combustion chamber 17.

Moreover, if the start timing of the first injection is delayed too much, an interval between the first injection and the second injection becomes shorter. When the injection interval is short, the area where the mixture gas is excessively rich may be formed because the second area of the rich mixture gas formed by the first injection and the second area formed by the second injection overlap with each other. When the engine load is the second load L2 or higher, the formation of the area where the mixture gas is excessively rich is prevented by fixing the start timing of the first injection. In detail, the injector 6 may start the first injection at 325° bTDC.

When the injection amount is less than the second injection amount m2, since the fuel injection amount is small, it is prevented that a portion of fuel flows into the intake passage 40 and/or the exhaust passage 50. When the engine load is lower than the second load L2, an outflow of fuel is reduced by the start timing of the first injection being advanced, and therefore, the period of time from the first injection to the ignition becomes longer. Since the dispersion time of fuel can be secured, the excessively rich mixture gas decreases, and therefore, the discharge amount of $NO_x$ is reduced.

When the operating state of the engine 1 is in the SPCCI lean range A5, the start timings of the second injection and the third injection are maintained, even if the engine load changes. The second injection is started in the middle period of the intake stroke, and the third injection is started in the late period of the intake stroke. The gas flow inside the combustion chamber 17 is strong during the middle period and the late period of the intake stroke. By not changing the start timings of the second injection and the third injection, the fuel of the second injection and the fuel of the third injection can be dispersed by the strong gas flow.

Moreover, when the engine load increases, the injection periods of the second injection and the third injection become longer because the injection amounts of the second injection and the third injection increase, respectively. By maintaining the start timings of the second injection and the third injection, the period of time from the end of fuel injection to the ignition does not become shorter. Therefore, the dispersion time of fuel can be secured. Moreover, by maintaining the start timings of the second injection and the third injection, the injection interval between the second injection and the third injection can be secured. As a result, the formation of the area where mixture gas is excessively rich can be prevented, and the discharge amount of NOx can be kept low.

The ECU 10 changes a ratio of the first injection, the second injection, and the third injection according to the fuel amount, as illustrated in the map 93. The injection ratio is a ratio of each injection with respect to the amount of fuel required per cycle. When the fuel amount is less than the third injection amount m3, the ratio of the first injection is increased and the ratios of the second injection and the third injection are decreased. Note that the ratio of the second injection is equal to the ratio of the third injection. If the ratio of the first injection is high, a large amount of fuel is injected at an earlier timing. Therefore, a long period of time for dispersing fuel can be secured. The formation of the area where the mixture gas is excessively rich is prevented.

When the engine load is lower than the third load L3, the ratios of the first injection, the second injection, and the third injection are maintained, even if the engine load changes. When the engine load is low, the discharge amount of $NO_x$ can be kept low. When the engine load is lower than the third load L3, a ratio of the injection amounts of the first injection, the second injection, and the third injection is 8:1:1, as one example. When the engine 1 operates at a certain load below the first load L1, the injection amount of the first injection is more than the injection amount of the second injection. The injection amount of the second injection is equal to the injection amount of the third injection.

When the fuel amount becomes the third injection amount m3 or more, the ratio of the first injection is decreased and the ratio of the second injection is increased. The ratio of the first injection decreases as the engine load increases, and the ratio of the second injection increases as the engine load increases. Note that when the fuel amount becomes the third injection amount m3 or more, the ratio of the third injection slightly decreases.

When the engine load increases, the injection amount required per cycle increases. The injection amounts of the first injection, the second injection, and the third injection increase. Moreover, as described above, the gas flow inside the combustion chamber 17 becomes stronger as the intake stroke progresses. The descending speed of the piston 3 is the highest in the middle period of an intake stroke. When the ratio of the amount of fuel of the second injection which is injected in the middle period of the intake stroke is increased, a large amount of fuel can be dispersed by utilizing the strong gas flow. It is advantageous for reducing the formation of the excessively rich mixture gas.

Moreover, since the injection timing of the second injection is earlier than that of the third injection, the dispersion time is longer. Therefore, it is more advantageous for the dispersion of fuel to increase the injection amount of the second injection than to increase the injection amount of the third injection.

In the example of FIG. 9, as a result of decreasing the ratio of the first injection and increasing the ratio of the second injection, the ratio of the second injection exceeds the ratio of the first injection for a fourth injection amount m4. When the engine 1 operates at a certain load which is a fourth load L4 or higher, the injection amount of the second injection is more than the injection amount of the first injection. The injection amount of the first injection is more than the injection amount of the third injection.

When the fuel amount becomes the second injection amount m2 or more, the ratios of the first injection, the second injection, and the third injection are fixed. Thus, the ratios of the first injection, the second injection, and the third injection do not change, even if the fuel amount increases. As described above, when the fuel amount becomes the second injection amount m2 or more, the injection timings of the first injection and the second injection are maintained. By maintaining the ratios of the first injection and the second injection corresponding to maintaining the injection timings, the formation of the area where the mixture gas is excessively rich is prevented. Moreover, since the injection period of the second injection becomes longer as the injection amount of the second injection increases, the period of time from the end of the second injection to the ignition becomes shorter. By not excessively increasing the ratio of the injection amount of the second injection, the time from the end of the second injection to the ignition can be extended. Therefore, the dispersion time of fuel can be secured and the formation of the area where the mixture gas is excessively rich can be prevented.

When the engine load is the second load L2 or higher, the ratio of the injection amounts of the first injection, the second injection, and the third injection is 3:6:1 as one example. When the engine 1 operates at a certain load which is the second load L2 or higher, the injection amount of the second injection is more than the injection amount of the first injection. The injection amount of the first injection is more than the injection amount of the third injection.

The ratio of the third injection is almost constant even if the fuel amount changes. The injection amount of the third injection is less than the injection amounts of the first injection and the second injection. For the third injection, only a small amount of fuel is injected so that the atomized fuel spray reaches a position different from the positions of the atomized fuel sprays of the first injection and the second injection. Since the start timing of the third injection is the latest, the period of time from the end of the third injection to the ignition is shorter. Because the injection amount of the third injection is always small, the formation of the area where the mixture gas is excessively rich can be prevented. Therefore, the discharge amount of $NO_x$ can be kept low.

Moreover, when the operating state of the engine 1 is in the SPCCI lean range A5, the injector 6 injects the entire amount of fuel required per cycle in an intake stroke. Since the injection is ended during the intake stroke, the period of time from the end of the injection to the ignition of the mixture gas by the spark plug 25 is longer. In the meantime, since fuel disperses, the formation of the area where the mixture gas is excessively rich can be prevented at the ignition timing.

Further, when the operating state of the engine 1 is in the SPCCI lean range A5, the injector 6 always performs the three injections comprised of the first injection, the second injection, and the third injection. The ECU 10 does not change the number of injections, even if the operating state of the engine 1 changes in the range A5, and therefore, the operation of the engine 1 is stabilized.

Figure 10:
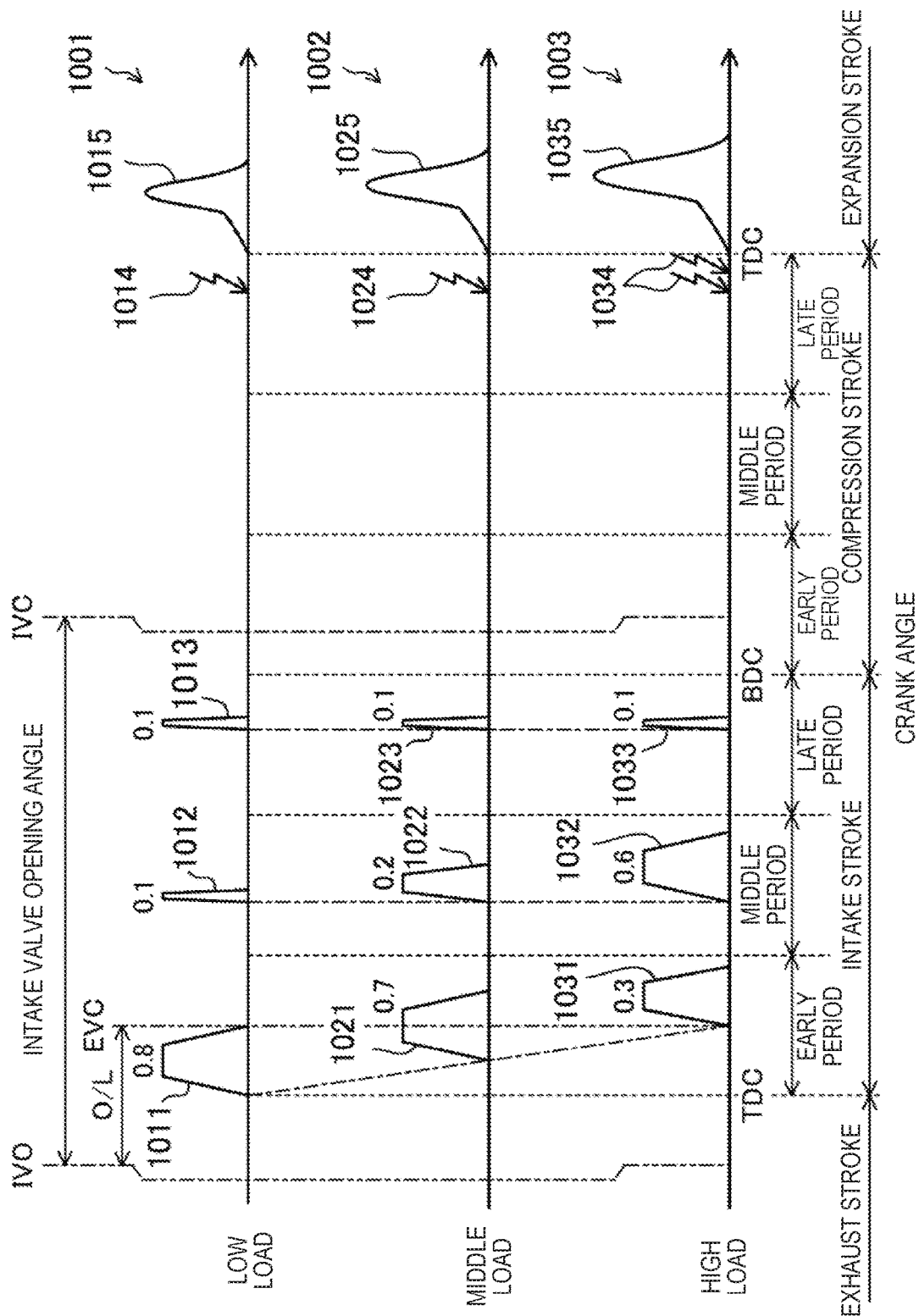
FIG. 10 is a timing chart illustrating injection timings of fuel and an ignition timing when the engine load is a low load, a middle load, and a high load.

FIG. 10 is a timing chart illustrating the open timings and the close timings of the intake valve 21 and the exhaust valve 22, the fuel injection timing, the injection amount, and the ignition timing, when the operating state of the engine 1 is in the SPCCI lean range A5. The crank angle advances as it goes to the right of FIG. 10. A trapezoid in FIG. 10 corresponds to an amount of lift of the needle valve of the injector 6, and an area of the trapezoid corresponds to the injection amount of fuel. That is, the injection amount of fuel increases as the trapezoid area is larger, and on the other hand, the injection amount of fuel decreases as the trapezoid area is smaller. The number indicated corresponding to each trapezoid is the ratio of the injection.

A chart 1001 of FIG. 10 corresponds to a case where the engine 1 operates at a low load in the SPCCI lean range A5, a chart 1002 corresponds to a case where the engine 1 operates at a middle load in the SPCCI lean range, and a chart 1003 corresponds to a case where the engine 1 operates at a high load in the SPCCI lean range. The term "low load" as used herein refers to a case where the fuel amount is less than the third injection amount m3, the term "middle load" refers to a case where the fuel amount is the third injection amount m3 or more and less than the second injection amount m2, and the term "high load" refers to a case where the fuel amount is the second injection amount m2 or more.

As illustrated in the chart 1001, first, when the engine 1 operates at the low load, the start timing of a first injection 1011 is advanced. The injector 6 performs the first injection 1011 during an overlap period O/L where both the intake valve 21 and the exhaust valve 22 are opened. The first injection 1011 is performed in the early period of an intake stroke. The injection amount of the first injection 1011 is more than the injection amount of a second injection 1012 and is more than the injection amount of a third injection 1013.

The injector 6 performs the second injection 1012 in the middle period of the intake stroke. A given interval is provided between the first injection 1011 and the second injection 1012. The injection amount of the second injection 1012 is the same as the injection amount of the third injection 1013. The injector 6 performs the third injection 1013 in the late period of the intake stroke. A given interval is provided also between the second injection 1012 and the third injection 1013.

After the end of the third injection 1013, during a period from the early period to the late period of a compression stroke, the second area where the mixture gas is relatively rich is formed near the spark plug 25 and the first area where the mixture gas is relatively lean and homogeneous is formed around the second area inside the combustion chamber 17 by the swirl flow. During the late period of a compression stroke, in more detail, near a compression top dead center, the ECU 10 causes the spark plug 25 to perform an ignition 1014. The spark plug 25 can stably ignite the rich mixture gas, and the mixture gas in the second area starts SI combustion. By the generation of heat and the pressure increase of SI combustion, the mixture gas in the first area starts CI combustion. Thus, the mixture gas carries out SPCCI combustion inside the combustion chamber 17 (see the combustion waveform 1015).

As illustrated in the chart 1002, when the engine 1 operates at the middle load, the start timing of a first injection 1021 is retarded more than the case where it operates at the low load. The injector 6 performs the first injection 1021 in the early period of an intake stroke. The injection amount of the first injection 1021 is more than the injection amount of a second injection 1022 and is more than the injection amount of a third injection 1023.

The injector 6 performs the second injection 1022 in the middle period of the intake stroke. The start timing of the second injection 1022 is the same as the case where the engine 1 operates at the low load. A given interval is provided between the first injection 1021 and the second injection 1022. The injection amount of the second injection 1022 is more than the injection amount of the third injection 1023. The injector 6 performs the third injection 1023 in the late period of the intake stroke. The start timing of the third injection 1023 is the same as the case where the engine 1 operates at the low load. A given interval is provided also between the second injection 1022 and the third injection 1023. The injection amount of the third injection 1023 is the smallest.

After the end of the third injection 1023, during the period from the early period to the late period of a compression stroke, the second area where the mixture gas is relatively rich is formed near the spark plug 25, and the first area where the mixture gas is relatively lean and homogeneous is formed around the second area inside the combustion chamber 17 by the swirl flow. In the late period of a compression stroke, in more detail, near a compression top dead center, the ECU 10 causes the spark plug 25 to perform an ignition 1024. The mixture gas carries out SPCCI combustion inside the combustion chamber 17 (see the combustion waveform 1025).

As illustrated in the chart 1003, when the engine 1 operates at the high load, the start timing of a first injection 1031 is retarded more than the case where it operates at the middle load. The start timing of the first injection 1031 becomes at or after the close timing of the exhaust valve 22 (EVC) illustrated by a two-dot chain line in FIG. 10. The injector 6 performs the first injection 1031 in the early period of an intake stroke. The injection amount of the first injection 1031 is less than the injection amount of a second injection 1032. The injection amount of the first injection 1031 is more than the injection amount of a third injection 1033.

The injector 6 performs the second injection 1032 in the middle period of the intake stroke. The start timing of the second injection 1032 is the same as the case where the engine 1 operates at the low load and the middle load. A given interval is provided between the first injection 1031 and the second injection 1032. The injection amount of the second injection 1032 is more than the injection amount of the third injection 1033. The injection amount of the second injection 1032 is the largest. The injector 6 performs the third injection 1033 in the late period of the intake stroke. The start timing of the third injection 1033 is the same as the case where the engine 1 operates at the low load and the middle load. A given interval is provided also between the second injection 1032 and the third injection 1033. The injection amount of the third injection 1033 is the smallest.

After the end of the third injection 1033, during the period from the early period to the late period of a compression stroke, the second area where the mixture gas is relatively rich is formed near the spark plug 25, and the first area where the mixture gas is relatively lean and homogeneous is formed around the second area inside the combustion chamber 17 by the swirl flow. The ECU 10 causes the spark plug 25 to perform an ignition 1034 in the late period of the compression stroke, in more detail, near a compression top dead center. The ECU 10 causes the spark plug 25 to perform a plurality of ignitions with the interval therebetween. Since an electric discharging period becomes longer by performing the plurality of ignitions, the mixture gas is stably ignited. The mixture gas carries out SPCCI combustion inside the combustion chamber 17 (see the combustion waveform 1035).

FIG. 11 is a flowchart according to a control of the engine 1 executed by the ECU 10. At Step S1 after a start, the ECU 10 reads the signals from the sensors SW1-SW11. At Step S2, the ECU 10 determines the operating state of the engine 1, and the subsequent Step S3, the ECU 10 determines whether the operating state of the engine 1 is in the SPCCI lean range A5. If the determination at Step S3 is NO, the process shifts to Step S4, and on the other hand, if YES, the process shifts to Step S10.

At Step S4, the ECU 10 sets the opening of the swirl control valve 56 according to the operating state of the engine 1. For example, when the operating state of the engine 1 is in the high-speed ranges A2 and B2, the ECU 10 fully opens the swirl control valve 56. Therefore, the pumping loss of the engine 1 decreases.

At Step S5, the ECU 10 sets the fuel amount corresponding to the operating state of the engine 1, and at the subsequent Step S6, the ECU 10 sets the valve timings of the intake valve 21 and the exhaust valve 22 according to the fuel amount. The ECU 10 adjusts the valve timings of the intake valve 21 and the exhaust valve 22 through the intake electric S-VT 23 and the exhaust electric S-VT 24, respectively.

At Step S7, the ECU 10 sets the amount of each injection according to the fuel amount. If the plurality of injections are to be performed, the ECU 10 distributes the injection amount set at Step S5 to the plurality of injections. If a single injection is to be performed, the injection amount set at Step S5 becomes the injection amount at Step S7. At the subsequent Step S8, the ECU 10 injects fuel at the timing according to the fuel amount, and at Step S9, the ECU 10 causes the spark plug 25 to perform ignition at the given timing.

On the other hand, when the operating state of the engine 1 is in the SPCCI lean range A5, the ECU 10 closes the swirl control valve 56 at Step S10. Therefore, the oblique swirl flow is generated inside the combustion chamber 17.

At Step S11, the ECU 10 sets the fuel amount corresponding to the operating state of the engine 1, and at the subsequent Step S12, the ECU 10 sets the valve timings of the intake valve 21 and the exhaust valve 22 based on the fuel amount and the map 91 of FIG. 9. As illustrated in the map 91, when the engine load is high and low, the open timing of the intake valve 21 is retarded, and when the engine load is moderate, the open timing of the intake valve 21 is advanced.

At Step S13, the ECU 10 sets the injection amounts of the first injection, the second injection, and the third injection based on the fuel amount and the map 93 of FIG. 9. At the subsequent Step S14, the ECU 10 determines the injection timings based on the fuel amount and the map 92 of FIG. 9, and performs the first injection, the second injection, and the third injection. Then, at Step S15, the ECU 10 causes the spark plug 25 to perform the single ignition or the two ignitions at the given timing(s).

Note that the fuel injection control device disclosed herein is not limited to the application to the engine 1 having the configuration described above. The fuel injection control device disclosed herein is applicable to engines having various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
11 Cylinder
17 Combustion Chamber
18 Intake Port
25 Spark Plug
56 Swirl Control Valve (Swirl Generator)
6 Injector (Fuel Injector)

What is claimed is:

1. A fuel injection control device, comprising:
an engine having a cylinder forming a combustion chamber;
a swirl control valve attached to the engine and configured to generate a swirl flow inside the combustion chamber;
a fuel injector with a plurality of nozzle holes, attached to the engine and configured to inject fuel into the combustion chamber through the nozzle holes;
a spark plug attached to the engine and configured to ignite a mixture gas inside the combustion chamber; and
a controller connected to the swirl control valve, the fuel injector, and the spark plug, and configured to output respective control signals to the swirl control valve, the fuel injector, and the spark plug,
wherein the fuel injector forms the mixture gas leaner than a stoichiometric air-fuel ratio inside the combustion chamber in response to the respective control signal,
wherein the spark plug ignites the lean mixture gas at a given timing in response to the respective control signal to cause a portion of the mixture gas to start combustion accompanied by flame propagation, and the remaining unburnt mixture gas then combusts by self-ignition,
wherein the fuel injector has at least a first nozzle hole and a second nozzle hole, and a first atomized fuel spray injected from the first nozzle hole and a second atomized fuel spray injected from the second nozzle hole separate from each other by the swirl flow,
wherein the controller is configured to cause the fuel injector to perform the fuel injection in an intake stroke, and the controller is configured to retard a start timing of the injection when an engine load is high compared to when the engine load is low, and
wherein the fuel injection when the engine load is high is performed within the intake stroke and is not performed within a compression stroke.

2. The fuel injection control device of claim 1, wherein the controller retards the start timing of the injection as the engine load increases.

3. The fuel injection control device of claim 1, wherein the controller establishes an overlap period during which both of an intake valve and an exhaust valve open, and causes the fuel injector to perform the fuel injection after the overlap period when the engine load is high.

4. The fuel injection control device of claim 1,
wherein when the engine load is less than a first load, the controller maintains the start timing of the fuel injection constant with respect to a change in the load, and
wherein when the engine load is the first load or greater, the controller retards the start timing of the fuel injection as the engine load increases.

5. The fuel injection control device of claim 4,
wherein when the engine load is the first load or greater and less than a second load, the controller retards the start timing of the fuel injection as the engine load increases, and
wherein when the engine load is the second load or greater, the controller maintains the start timing of the fuel injection constant with respect to the change in the load.

6. The fuel injection control device of claim 1,
wherein when the engine load is a second load or greater, the controller maintains the start timing of the fuel injection constant with respect to a change in the load, and
wherein when the engine load is less than the second load, the controller retards the start timing of the fuel injection as the engine load increases.

7. The fuel injection control device of claim 1,
wherein the fuel injector sequentially performs a first injection and a second injection in the intake stroke in response to the respective control signal,
wherein the controller retards a start timing of the first injection and maintains a start timing of the second injection constant as the engine load increases, and
wherein the start timing of the first injection is configured within the intake stroke and not within the compression stroke.

8. The fuel injection control device of claim 7,
wherein the fuel injector performs a third injection after the second injection in the intake stroke, in response to the respective control signal,
wherein the controller maintains a start timing of the third injection constant with respect to a change in the engine load, and
wherein the start timing of the third injection is configured within the intake stroke.

9. The fuel injection control device of claim 1, wherein the fuel injector injects the entire amount of fuel required per cycle in the intake stroke.

10. The fuel injection control device of claim 1,
wherein the engine has an intake port configured to generate a tumble flow inside the combustion chamber,
wherein the swirl control valve is provided to an intake passage of the engine, and generates an oblique swirl flow inclined to the center axis of the cylinder by closing the swirl control valve,
wherein the nozzle holes of the fuel injector are disposed in a central part of a ceiling of the combustion chamber, and
wherein the fuel injector injects fuel toward the oblique swirl flow radially and simultaneously through the plurality of nozzle holes.

11. The fuel injection control device of claim 1,
wherein the swirl control valve generates the swirl flow of a swirl ratio at or greater than 2:1 and at or less than 6:1, in response to the respective control signal, and
wherein the fuel injector injects fuel at or greater than 30 MPa and at or less than 120 MPa toward the swirl flow.

12. The fuel injection control device of claim 1, wherein the controller adjusts a timing of the self-ignition by adjusting an amount of the combustion accompanied by the flame propagation.

13. The fuel injection control device of claim 1, wherein the fuel injector further has a third nozzle hole and a fourth nozzle hole, and the first atomized fuel spray injected from the first nozzle hole and the second atomized fuel spray injected from the second nozzle hole separate from each other by the swirl flow, and a third atomized fuel spray injected from the third nozzle hole and a fourth atomized fuel spray injected from the fourth nozzle hole approach each other by the swirl flow so that a first area and a second area where the mixture gas is richer than the mixture gas in the first area are formed inside the combustion chamber.

14. The fuel injection control device of claim 13,
wherein the fuel injector sequentially performs a first injection and a second injection with an injection interval therebetween in response to the respective control signal, and
wherein the second area formed by the first injection, and the second area formed by the second injection are offset in positions inside the combustion chamber from each other.

15. The fuel injection control device of claim 1, wherein when the engine is in a given specific operating state where an engine speed is low and the engine load is low, the controller causes the fuel injector to perform the fuel injection in the intake stroke so that mixture gas leaner than the stoichiometric air-fuel ratio is formed inside the combustion chamber.

16. The fuel injection control device of claim 1,
wherein the fuel injector sequentially performs a first injection and a second injection and a third injection in the intake stroke in response to the respective control signal, and
wherein the injector starts the first injection in an early period of the intake stroke, starts the second injection in a middle period of the intake stroke, and starts the third injection in a late period of the intake stroke.

17. A method of controlling injection of fuel, comprising the steps of:
forming, by a fuel injector having at least a first nozzle hole and a second nozzle hole, mixture gas leaner than a stoichiometric air-fuel ratio inside a combustion chamber formed in a cylinder of an engine;
igniting, by a spark plug, the lean mixture gas at a given timing to cause a portion of the mixture gas to start combustion accompanied by flame propagation, and then combusting the remaining unburnt mixture gas by self-ignition;
separating a first atomized fuel spray injected from the first nozzle hole and a second atomized fuel spray injected from the second nozzle hole from each other by a swirl flow generated inside the combustion chamber; and
performing, by the fuel injector, a fuel injection in an intake stroke, and retarding a start timing of the injection when an engine load is high compared to when the engine load is low,
wherein the fuel injection when the engine load is high is performed within the intake stroke and is not performed within a compression stroke.

18. The fuel injection control device of claim 16,
wherein the controller retards the start timing of the first injection as the engine load increases, and wherein the retarding of the start timing of the first injection is performed within the early period of the intake stroke.

\* \* \* \* \*